(12) United States Patent
Ariyoshi

(10) Patent No.: US 7,481,574 B2
(45) Date of Patent: Jan. 27, 2009

(54) THERMAL FLOW RATE SENSOR SUPPLYING DIGITAL OUTPUT

(75) Inventor: Yuji Ariyoshi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 148 days.

(21) Appl. No.: 11/416,142

(22) Filed: May 3, 2006

(65) Prior Publication Data

US 2007/0140309 A1 Jun. 21, 2007

(30) Foreign Application Priority Data

Dec. 16, 2005 (JP) ............... 2005-363181

(51) Int. Cl.
 *G01N 25/00* (2006.01)
 *G01K 13/02* (2006.01)
 *G01F 1/00* (2006.01)
(52) U.S. Cl. .................. 374/11; 374/141; 374/114; 374/135; 73/204.25
(58) Field of Classification Search ............ 374/29, 374/39–40, 114, 141, 208, 10, 43–44, 112
See application file for complete search history.

(56) References Cited

U.S. PATENT DOCUMENTS

| 2,137,133 | A | * | 11/1938 | Dalimann ............... 374/41 |
| 3,080,745 | A | * | 3/1963 | Jones .................. 73/23.21 |
| 3,081,628 | A | * | 3/1963 | Salera ................. 73/204.19 |
| 3,216,249 | A | * | 11/1965 | Karlheinz .............. 73/204.21 |
| 3,616,677 | A | * | 11/1971 | Oppegaard ............. 73/23.21 |
| 3,731,072 | A | * | 5/1973 | Johnston ................ 702/46 |
| 3,747,396 | A | * | 7/1973 | O'Neill ................. 374/11 |
| 4,043,195 | A | | 8/1977 | Hunting |

(Continued)

FOREIGN PATENT DOCUMENTS

| GB | 2034480 | A | * | 6/1980 |
| JP | 63206616 | A | * | 8/1988 |
| JP | 05332851 | A | * | 12/1993 |
| JP | 2002-005717 | | | 1/2002 |

OTHER PUBLICATIONS

Pan et al., "A New Class of Integrated Thermal Oscillators with Duty-Cycle Output for Application in Thermal Sensors", Sensors and Actuators, A21-A23 (1990), Netherlands, pp. 655-659.

(Continued)

*Primary Examiner*—Gail Verbitsky
(74) *Attorney, Agent, or Firm*—Leydig, Voit & Mayer, Ltd.

(57) ABSTRACT

A thermal flow rate sensor includes: a bridge circuit having a heat-generating resistor generating heat by receiving a supplied current, a heating element temperature detector having a resistance value varying in accordance with a temperature of the heat-generating resistor and a fluid temperature detector having a resistance value varying in accordance with a temperature of a fluid; a comparison portion supplying a digital output indicating a difference between voltages at intermediate points in the bridge circuit; a DA converter converting an output from the comparison portion to an analog signal and supplying the resultant signal to the heat-generating resistor as the current; and an output operation portion accumulating outputs from the comparison portion for a prescribed period to output a result of accumulation as a flow rate for the prescribed period, of the fluid which is an object of measurement.

9 Claims, 20 Drawing Sheets

U.S. PATENT DOCUMENTS

| | | | | |
|---|---|---|---|---|
| 4,080,821 A * | 3/1978 | Johnston | ................... | 73/25.03 |
| 4,140,396 A * | 2/1979 | Allington | ................... | 356/517 |
| 4,255,962 A * | 3/1981 | Ashman | ................... | 374/10 |
| 4,293,916 A * | 10/1981 | Del Re et al. | ................... | 703/6 |
| 4,482,006 A * | 11/1984 | Anderson | ................... | 165/11.1 |
| 4,483,200 A * | 11/1984 | Togawa et al. | ................... | 73/861.95 |
| 4,485,449 A * | 11/1984 | Knauss | ................... | 702/46 |
| 4,587,842 A | 5/1986 | Handtmann | | |
| 4,722,611 A * | 2/1988 | Hultgren | ................... | 374/43 |
| 4,733,559 A | 3/1988 | Aine et al. | | |
| 4,779,458 A * | 10/1988 | Mawardi | ................... | 374/41 |
| 4,787,053 A * | 11/1988 | Moore | ................... | 701/123 |
| 4,953,986 A * | 9/1990 | Olson et al. | ................... | 374/136 |
| 4,984,460 A * | 1/1991 | Isoda | ................... | 73/204.15 |
| 5,063,352 A | 11/1991 | Kleinhans | | |
| 5,064,296 A | 11/1991 | Huijsing et al. | | |
| 5,311,447 A * | 5/1994 | Bonne | ................... | 702/50 |
| 5,772,321 A * | 6/1998 | Rhodes | ................... | 374/44 |
| 6,023,969 A * | 2/2000 | Feller | ................... | 73/204.25 |
| 6,190,039 B1 * | 2/2001 | Yaguchi | ................... | 374/164 |
| 6,455,820 B2 * | 9/2002 | Bradenbaugh | ................... | 219/481 |
| 6,529,847 B2 * | 3/2003 | Hamilton et al. | ................... | 702/127 |
| 6,662,121 B1 * | 12/2003 | Oda et al. | ................... | 702/45 |
| 6,752,014 B1 | 6/2004 | Kanke et al. | | |
| 6,916,664 B2 * | 7/2005 | Bonne et al. | ................... | 436/143 |
| 7,021,821 B2 * | 4/2006 | Bonne | ................... | 374/44 |
| 7,419,329 B1 * | 8/2008 | Severson | ................... | 374/16 |
| 2003/0004666 A1 | 1/2003 | Matsumura et al. | | |
| 2004/0244478 A1 | 12/2004 | Kanke et al. | | |
| 2004/0250601 A1 * | 12/2004 | Lin | ................... | 73/25.03 |
| 2005/0265422 A1 * | 12/2005 | Bonne | ................... | 374/44 |

OTHER PUBLICATIONS

Verhoeven et al., "Design of Integrated Thermal Flow Sensors Using Thermal Sigma-Delta Modulation", Sensors and Actuators A52 (1996), Netherlands, pp. 198-202.

* cited by examiner

THERMAL FLOW RATE SENSOR SUPPLYING DIGITAL OUTPUT

BACKGROUND OF THE INVENTION

1. Field of the Invention

The present invention relates to a thermal flow rate sensor, and more particularly to a thermal flow rate sensor supplying a digital output.

2. Description of the Background Art

A thermal flow rate sensor detecting a flow rate of a fluid by electrically detecting an amount of heat transmitted to the fluid has been known.

For example, Japanese Patent Laying-Open No. 2002-005717 (Patent Document 1) discloses a thermal flow rate sensor, including a first temperature detection resistor formed on a substrate on a side upstream with respect to a direction of flow of a fluid, a second temperature detection resistor formed on the substrate on a side downstream with respect to the direction of flow of the fluid, a heat-generating resistor formed on the substrate to heat the first and second temperature detection resistors, and a first fluid temperature detection resistor and a second fluid temperature detection resistor formed on the substrate at positions not affected by the heat-generating resistor, in which each resistor and one fixed-value resistor or a plurality of fixed-value resistors are connected to each other to form a bridge circuit, and a flow rate of the fluid is determined by detecting a heating current that is correlated with the flow rate of the fluid and is fed through the heat-generating resistor such that the bridge circuit returns to a balanced state from an unbalanced state that has been caused by variation in the temperature of the first temperature detection resistor and the second temperature detection resistor in accordance with the flow rate of the fluid. According to such a configuration, a temperature characteristic of a heat dissipation coefficient having flow rate dependency can effectively be compensated for and temperature dependency of a sensor output can be suppressed.

On the other hand, as the thermal flow rate sensor according to Patent Document 1 supplies an analog output, an AD (Analog to Digital) converter should be provided in order to obtain a digital output for connection to a computer, a CPU (Central Processing Unit) and the like, and a circuit configuration has been complicated due to mixed presence of an analog circuit and a digital circuit.

It is noted that the digital output hereinafter refers to a signal having "1" or "0" that can be taken in the computer, the CPU and the like and processed therein.

In order to solve the above-described problems, for example, Japanese Patent Laying-Open No. 03-042534 (Patent Document 2), Y. Pan et al., "A New Class of Integrated Thermal Oscillators with Duty-cycle Output for Application in Thermal Sensors," Sensors and Actuators A21-A23 (1990) pp. 655-659 (Non-Patent Document 1), and H. Verhoeven et al., "Design of integrated thermal flow sensors using thermal sigma-delta modulation," Sensors and Actuators A52 (1996) pp. 198-202 (Non-Patent Document 2) disclose a thermal flow rate sensor adopting $\Sigma\Delta$ control method as the thermal flow rate sensor capable of obtaining a digital output.

It is generally demanded that the digital output of the sensor attains high resolution and quick response. The thermal flow rate sensors according to Patent Document 2, Non-Patent Document 1 and Non-Patent Document 2, however, do not include a configuration for obtaining a digital output attaining high resolution and quick response as the sensor output. For example, in the thermal flow rate sensor according to Non-Patent Document 2, a 10-bit sensor output is updated every 20 msec as shown in Table 1 of Non-Patent Document 2. Namely, the output of the thermal flow rate sensor according to Non-Patent Document 2 merely has resolution of 10 bits and frequency response of 50 Hz.

SUMMARY OF THE INVENTION

An object of the present invention is to provide a thermal flow rate sensor capable of obtaining a digital output attaining high resolution and quick response as a sensor output.

A thermal flow rate sensor measuring a flow rate of a fluid according to one aspect of the present invention includes: a bridge circuit including a heat-generating resistor generating heat by receiving a supplied current, a first temperature detector having a resistance value varying in accordance with a temperature of the heat-generating resistor, and a second temperature detector having a resistance value varying in accordance with a temperature of the fluid; a comparison portion supplying a digital output indicating a difference between voltages at intermediate points in the bridge circuit; a DA converter converting an output from the comparison portion to an analog signal and supplying the resultant signal to the heat-generating resistor as the current; and an output operation portion accumulating outputs from the comparison portion for a prescribed period to output a result of accumulation as a flow rate for the prescribed period, of the fluid which is an object of measurement.

A thermal flow rate sensor measuring a flow rate of a fluid according to another aspect of the present invention includes: a bridge circuit including a heat-generating resistor generating heat by receiving a supplied current, a first temperature detector having a resistance value varying in accordance with a temperature of the heat-generating resistor, and a second temperature detector having a resistance value varying in accordance with a temperature of the fluid; a comparison portion comparing voltages at intermediate points in the bridge circuit and supplying a digital output indicating a result of comparison; a counter portion counting duration during which the digital output indicating the result of comparison is constant by counting clocks; a DA converter converting an output from the counter portion to an analog signal and supplying the resultant signal to the heat-generating resistor as the current; and an output operation portion accumulating outputs from the counter portion for a prescribed period to output a result of accumulation as a flow rate for the prescribed period, of the fluid which is an object of measurement.

A thermal flow rate sensor measuring a flow rate of a fluid according to yet another aspect of the present invention includes: a heat-generating resistor generating heat by receiving a supplied current; a first temperature detector having a resistance value varying in accordance with a temperature of the heat-generating resistor; a second temperature detector having a resistance value varying in accordance with a temperature of the fluid; a comparison portion comparing a voltage at a portion other than both end portions of the first temperature detector and a voltage at a portion other than both end portions of the second temperature detector and supplying a digital output indicating a result of comparison; a voltage-controlled current source determining a value of the current based on the digital output indicating the result of comparison and regardless of variation in the resistance value of the heat-generating resistor and supplying the current to the heat-generating resistor; and an output operation portion operating a flow rate for a prescribed period, of the fluid which is an object of measurement based on the digital output indicating the result of comparison for the prescribed period and supplying a digital output indicating a result of the operation.

According to the present invention, a digital output attaining high resolution and quick response can be obtained as a sensor output.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
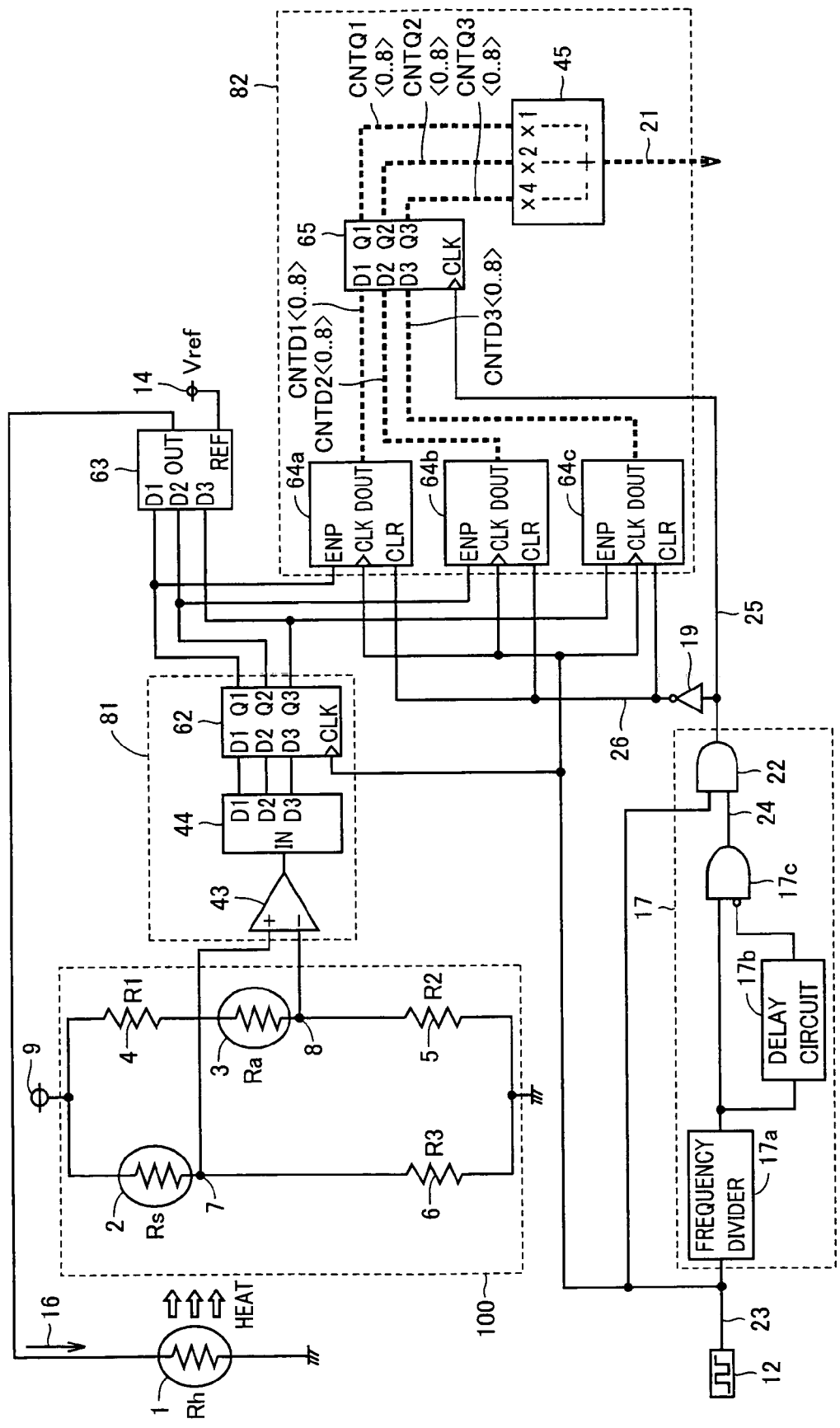
FIG. 1 is a functional block diagram showing a configuration of a thermal flow rate sensor according to Embodiment 1 of the present invention.

An embodiment of the present invention will be described hereinafter with reference to the drawings. As the same or corresponding elements have the same reference characters allotted, detailed description thereof will not be repeated.

EMBODIMENT 1

[Configuration and Basic Operation]

FIG. 1 is a functional block diagram showing a configuration of a thermal flow rate sensor according to Embodiment 1 of the present invention. Referring to FIG. 1, the thermal flow rate sensor includes a heat-generating resistor 1, a heating element temperature detector (first temperature detector) 2, a fluid temperature detector (second temperature detector) 3, fixed-value resistors 4 to 6, a fixed power supply 9, a clock generator 12, a DA (Digital to Analog) converter 63, a fixed power supply 14, an update signal generator 17, an inverter 19, a comparison portion 81, and an output operation portion 82. Update signal generator 17 includes a frequency divider 17a, a delay circuit 17b, a gate 17c, and an AND gate 22. Comparison portion 81 includes a differential amplifier 43, an AD converter 44 and a flip-flop 62. Output operation portion 82 includes counters 64a to 64c, a flip-flop 65 and a weighting adder 45.

Heating element temperature detector 2 has a resistance value varying in accordance with the temperature. Heat-generating resistor 1 is arranged in the vicinity of heating element temperature detector 2, and generates heat by receiving a supplied current (hereinafter, also referred to as the current for heating or the heating current) I16, to heat heating element temperature detector 2. Fluid temperature detector 3 is arranged in a position not heated by heat-generating resistor 1, and has a resistance value varying in accordance with the temperature of the fluid.

Bridge circuit 100 is constituted of heating element temperature detector 2, fluid temperature detector 3 and fixed-value resistors 4 to 6. A connection point of heating element temperature detector 2 and fixed-value resistor 6 serves as an intermediate point 7 of bridge circuit 100, while a connection point of fluid temperature detector 3 and fixed-value resistor 5 serves as an intermediate point 8 of bridge circuit 100. It is noted here that intermediate points 7 and 8 of bridge circuit 100 refer to points that are equipotential when bridge circuit 100 is balanced.

A voltage at the intermediate point of bridge circuit 100 refers to a voltage at the connection point of heating element temperature detector 2 and fixed-value resistor 6, and a voltage at the connection point of fluid temperature detector 3 and fixed-value resistor 5.

Heat-generating resistor 1, heating element temperature detector 2 and fluid temperature detector 3 are formed from a thermosensitive resistor material having a resistance value varying in accordance with the temperature, such as platinum and nickel.

A resistance value of fixed-value resistors 4 to 6 is determined, for example, such that the temperature of heating element temperature detector 2 is higher than the temperature of fluid temperature detector 3 by a prescribed value when bridge circuit 100 is in the balanced state while the flow rate is set to a prescribed value between 1 g/s to 200 g/s.

Differential amplifier 43 has a non-inverting input terminal connected to intermediate point 7 of bridge circuit 100 and an inverting input terminal connected to intermediate point 8 of bridge circuit 100. Differential amplifier 43 outputs an analog voltage corresponding to a voltage difference between intermediate point 7 and intermediate point 8.

AD converter 44 has resolution of 3 bits, and converts the analog voltage received from differential amplifier 43 to a digital value, so as to output the resultant digital value as data D1 to D3. Here, output data D1 of AD converter 44 corresponds to LSB, and output data D3 thereof corresponds to MSB. It is noted that the resolution of AD converter 44 is not limited to 3 bits, and may be set to different number of bits.

Flip-flop 62 samples and holds data D1 to D3 received from AD converter 44 at timing of a clock 23 generated by clock generator 12, and outputs the held data.

DA converter 63 converts data D1 to D3 received from flip-flop 62 to an analog voltage based on a reference voltage Vref supplied from fixed power supply 14, and supplies the resultant voltage to heat-generating resistor 1. Namely, DA converter 63 supplies the heating current to heat-generating resistor 1 based on the output from comparison portion 81. DA converter 63 has resolution of 3 bits.

When the voltage difference between intermediate point 7 and intermediate point 8 is small, the output voltage of differential amplifier 43 is small, and the voltage supplied from DA converter 63 to heat-generating resistor 1 is accordingly small. When the voltage difference between intermediate point 7 and intermediate point 8 is great, the output voltage of differential amplifier 43 is large, and the voltage supplied from DA converter 63 to heat-generating resistor 1 is accordingly large. As AD converter 44 has resolution of 3 bits, the voltage supplied to heat-generating resistor 1 varies in 8 steps.

Update signal generator 17 generates an update signal 25. More specifically, frequency divider 17a divides the frequency of clock 23 so as to convert clock 23 to a frequency-divided clock having a low frequency. Delay circuit 17b delays the frequency-divided clock received from frequency divider 17a and outputs the resultant clock. Gate 17c outputs a logical product of the frequency-divided clock received from frequency divider 17a and the clock obtained by inverting the logic level of the clock received from delay circuit 17b. AND gate 22 outputs the logical product of data received from gate 17c and clock 23 as update signal 25.

Inverter 19 outputs an update signal 26 obtained by inverting the logic level of update signal 25.

Counters 64a to 64c count the number of clocks 23 while data D1 to D3 received from flip-flop 62 are at H level, and output count results CNTD1 to CNTD3 of 9 bits respectively. In addition, counters 64a to 64c are reset at the timing of falling of update signal 26 received from inverter 19, whereby each bit of count result CNTD1 to CNTD3 is set to L level. Here, counters 64a to 64c supply digital outputs. In the drawing, each of the outputs of counters 64a to 64c is represented by one thick dotted line, however, actually, there are output lines in the number equal to that of output bits of counters 64a to 64c. Namely, CNTD1 to 3 <0 . . . 8> in the drawing indicates that 9-bit data passes through the thick dotted line. In the description hereinafter, the thick dotted line represents a digital bus output.

Flip-flop 65 samples and holds count results CNTD1 to CNTD3 received from counters 64a to 64c at the timing of rising of update signal 25 received from AND gate 22, and outputs the held data as count results CNTQ1 to CNTQ3.

Weighting adder 45 multiplies count results CNTQ1 to CNTQ3 received from flip-flop 65 by 1, 2 and 4 respectively, and thereafter performs addition. The addition result represents the total of heating current levels in one cycle of update signal 25 and update signal 26. Weighting adder 45 outputs the addition result as a digital output 21 of the thermal flow rate sensor.

Update signal 26 falls immediately after flip-flop 65 outputs digital output 21 at the timing of rising of update signal 25, and each bit of count results CNTD1 to CNTD3 output from counters 64a to 64c is set to L level. Therefore, digital output 21 is updated for each one cycle of update signal 25 and update signal 26.

Figure 2:
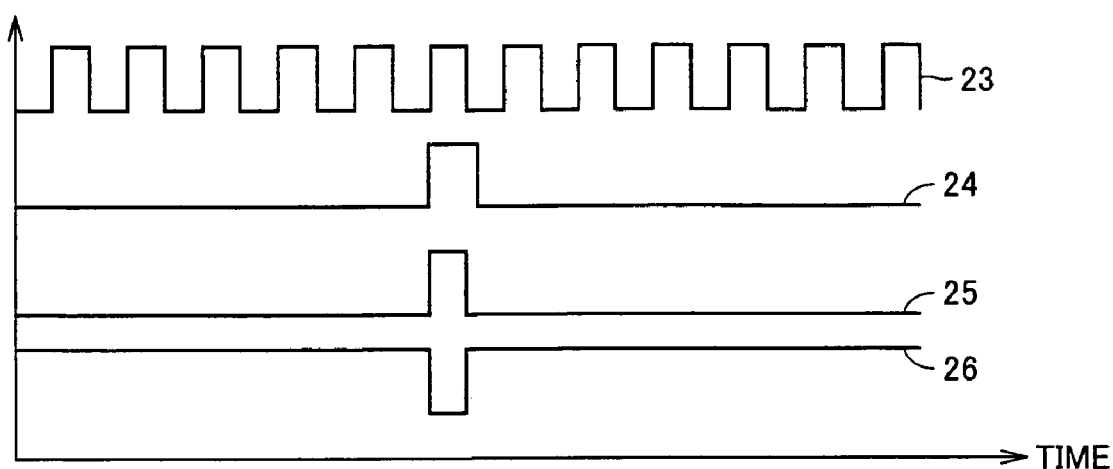
FIG. 2 is a timing chart of a clock 23, a frequency-divided clock 24, an update signal 25, and an update signal 26.

FIG. 2 is a timing chart of clock 23, frequency-divided clock 24, update signal 25, and update signal 26.

Referring to FIG. 2, counters 64a to 64c clear the count value of clock 23 at the timing of falling of update signal 26. Flip-flop 65 samples and holds the count result received from counters 64a to 64c at the timing of rising of update signal 25, that is, the timing immediately before counters 64a to 64c clear the count value of clock 23, and outputs the held data as count results CNTQ1 to CNTQ3.

[Operation]

An operation of the thermal flow rate sensor according to Embodiment 1 of the present invention will now be described. Referring again to FIG. 1, when the fluid flows toward heating element temperature detector 2, heating element temperature detector 2 is cooled and the resistance value becomes smaller.

When the resistance value of heating element temperature detector 2 becomes smaller, the voltage at intermediate point 7 is raised, the output voltage of differential amplifier 43 becomes larger, and the output data of AD converter 44 has a large value.

Flip-flop 62 samples and holds data D1 to D3 received from AD converter 44 at the timing of clock 23 generated by clock generator 12, and outputs the held data.

DA converter 63 converts data D1 to D3 having a large value and received from flip-flop 62 to an analog voltage having a correspondingly high voltage value, and supplies the voltage to heat-generating resistor 1.

When a high voltage, that is, the heating current having a large current value, is supplied to heat-generating resistor 1, an amount of heat generated by heat-generating resistor 1 is increased and the temperature of heat-generating resistor 1 is raised. When the temperature of heat-generating resistor 1 is raised, the temperature of heating element temperature detector 2 located in the vicinity of heat-generating resistor 1 is also raised and the voltage at intermediate point 7 is lowered. While the voltage at intermediate point 7 is higher than that at intermediate point 8, supply of the heating current having a large current value to heat-generating resistor 1 continues.

When the voltage at intermediate point 7 becomes lower than that at intermediate point 8, the output voltage of differential amplifier 43 becomes smaller and the output data of AD converter 44 has a small value. DA converter 63 converts data D1 to D3 having a small value and received from flip-flop 62 to an analog voltage having a correspondingly low voltage value, and supplies the voltage to heat-generating resistor 1.

As the voltage, i.e., the heating current, supplied from DA converter 63 becomes smaller, the temperature of heat-generating resistor 1 is lowered. When the temperature of heat-generating resistor 1 is lowered, the temperature of heating element temperature detector 2 located in the vicinity of heat-generating resistor 1 is also lowered and the voltage at intermediate point 7 is raised.

Figure 3A:
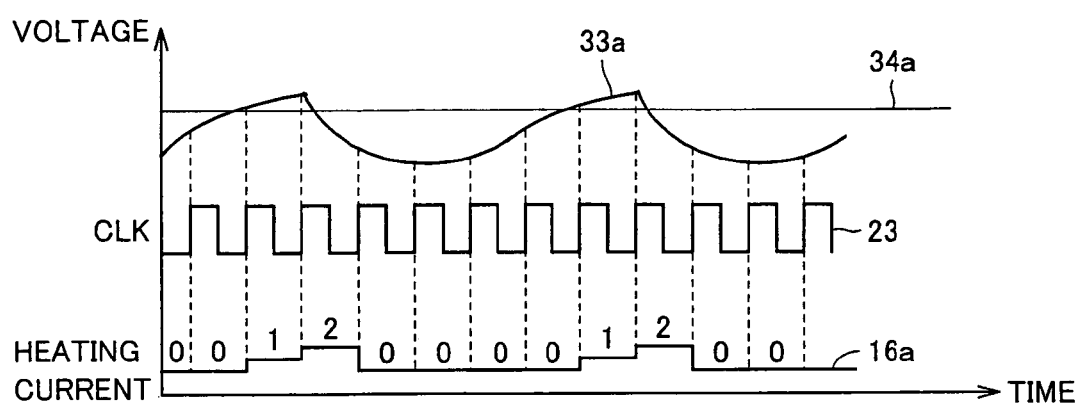
FIG. 3A shows a voltage at an intermediate point 7 and an intermediate point 8, clock 23 and a heating current when a flow rate is small.
Figure 3B:
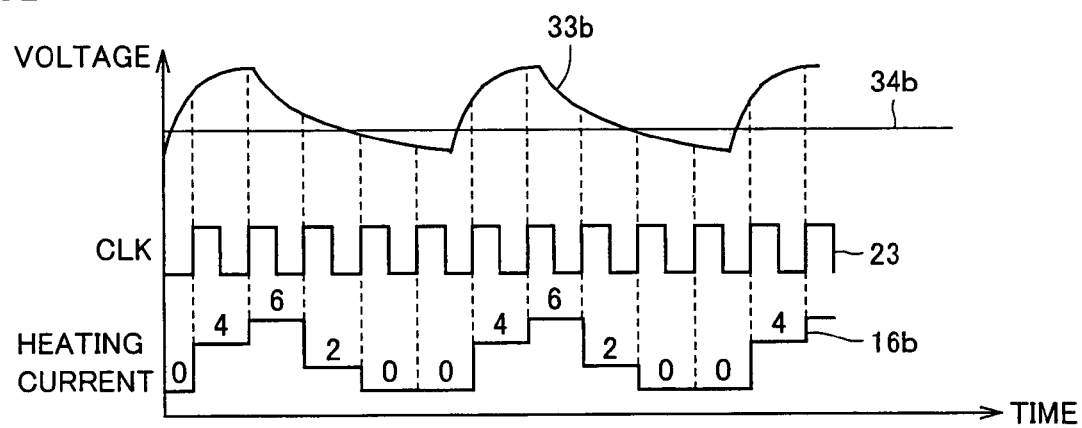
FIG. 3B shows a voltage at intermediate point 7 and intermediate point 8, clock 23 and the heating current when the flow rate is large.

FIG. 3A shows a voltage at intermediate point 7 and intermediate point 8, clock 23 and the heating current when the flow rate is small. FIG. 3B shows a voltage at intermediate point 7 and intermediate point 8, clock 23 and the heating current when the flow rate is large.

Referring to FIG. 3A, a voltage 33a at intermediate point 7 fluctuates across a voltage 34a at intermediate point 8. When the flow rate of the fluid is small, a cooling effect is low, that is, an amount of heat dissipation from heat-generating resistor 1 to the fluid is small. Then, as decrease in the resistance value of heating element temperature detector 2 is small, increase in the voltage at intermediate point 7 is small and the voltage difference between intermediate point 7 and intermediate point 8 becomes smaller. Accordingly, the output data of AD converter 44 has a small value, and the heating current takes a current value represented as 0 to 2. As the cooling effect is low, the temperature of heat-generating resistor 1 is raised in a short heating time period in spite of a low heating current level. Therefore, the voltage difference between intermediate point 7 and intermediate point 8 turns to negative in a short period of time in differential amplifier 43, data D1 to D3 output from AD converter 44 are all set to L level, and the level of the heating current is set to 0. In addition, as the cooling effect is low, once the temperature of heat-generating resistor 1 is raised, it takes a long time for the temperature to lower, whereby the state in which the level of the heating current is set to 0 continues for a long time.

Referring to FIG. 3B, a voltage 33b at intermediate point 7 fluctuates across a voltage 34b at intermediate point 8. When the flow rate of the fluid is large, a cooling effect is high, that is, an amount of heat dissipation from heat-generating resistor 1 to the fluid is large. Then, as decrease in the resistance value of heating element temperature detector 2 is large, increase in the voltage at intermediate point 7 is large and the voltage difference between intermediate point 7 and intermediate point 8 becomes greater. Accordingly, the output data of AD converter 44 has a large value, and the heating current takes a current value represented as 0 to 6. As the cooling effect is high, the temperature of heat-generating resistor 1 is not readily raised in spite of a large amount of heating current. Therefore, it takes a long time for the voltage difference between intermediate point 7 and intermediate point 8 to turn to negative in differential amplifier 43. In addition, as the cooling effect is high, even if the temperature of heat-generating resistor 1 is once raised, the temperature thereof is soon lowered. Namely, the state in which the level of the heating current is set to 0 ends in a short period of time.

As shown in FIG. 3A, when the flow rate of the fluid is small, the heating current in an amount of the total of 3 levels is supplied to heat-generating resistor 1 in a time period comparable to three cycles of clock 23. Alternatively, as shown in FIG. 3B, when the flow rate of the fluid is large, the heating current in an amount of the total of 12 levels is supplied to heat-generating resistor 1 in a time period comparable to three cycles of clock 23.

Therefore, the flow rate of the fluid for a prescribed period can be detected by calculating the total amount of the output data from AD converter 44 for the prescribed period.

Here, in the thermal flow rate sensor according to Embodiment 1 of the present invention, AD converter 44 has resolution of 3 bits. Therefore, the sensor output at the maximum of 7 can be obtained in one clock operation, that is, in one clock of clock 23.

In the thermal flow rate sensor according to Embodiment 1 of the present invention, the frequency of the clock of counters 64a to 64c, that is, clock 23 is set to 714 kHz. Moreover, update signal generator 17 is configured such that update signal 25 and update signal 26 have a frequency of 2 kHz. Here, the number of output bits of counters 64a to 64c may be set to 9 bits. As weighting adder 45 multiplies count results CNTQ1 to CNTQ3 of counters 64a to 64c by 1, 2 and 4 respectively and thereafter performs addition, digital output 21 has 11 bits.

Meanwhile, as the thermal flow rate sensor according to Patent Document 1 supplies an analog output, an AD converter should be provided in order to obtain a digital output, and the circuit configuration has been complicated due to mixed presence of an analog circuit and a digital circuit. On the other hand, the thermal flow rate sensors according to Patent Document 2, Non-Patent Document 1 and Non-Patent Document 2 do not include a configuration for obtaining a digital output attaining high resolution and quick response as the sensor output.

In the thermal flow rate sensor according to Embodiment 1 of the present invention, however, comparison portion 81 compares the voltages at intermediate point 7 and intermediate point 8 of bridge circuit 100, and supplies the digital output indicating the result of comparison. Counters 64a to 64c count the number of clocks 23 while data D1 to D3 received from comparison portion 81 are at H level. Weighting adder 45 multiplies count results CNTQ1 to CNTQ3 of counters 64a to 64c by 1, 2 and 4 respectively, and thereafter performs addition. The addition result represents the total of the heating current levels in one cycle of update signal 25 and update signal 26, and it is output as 11-bit digital output 21 of the thermal flow rate sensor. Digital output 21 is updated for each one cycle of update signal 25 and update signal 26. According to such a configuration, it is no longer necessary to provide an AD converter for converting an analog output of the sensor to a digital output, and the circuit configuration can be simplified. In addition, as digital output 21 having the resolution of 11 bits and the frequency response of 2 kHz can be obtained, the sensor output attaining high resolution and quick response can be obtained.

In addition, in the thermal flow rate sensor according to Embodiment 1 of the present invention, as digital output 21 having the resolution of 11 bits and the frequency response of 2 kHz can be obtained by using a low-speed frequency of 714 kHz as clock 23, a circuit element for low-speed operation can be used instead of a special circuit element for achieving high-speed operation, and simplified circuit configuration and reduction in manufacturing cost can be achieved.

Moreover, in the thermal flow rate sensor according to Embodiment 1 of the present invention, AD converter 44 should only have the resolution of 3 bits in order to obtain digital output 21 having the resolution of 11 bits, and complicated circuit configuration and increase in manufacturing cost due to inclusion of the AD converter attaining high resolution can be prevented.

Another embodiment of the present invention will now be described with reference to the drawings. As the same or corresponding elements have the same reference characters allotted, detailed description thereof will not be repeated.

Embodiment 2

The present embodiment relates to a thermal flow rate sensor different from the thermal flow rate sensor according to Embodiment 1 in a method of counting output data from AD converter 44. The configuration and operation other than those described below are the same as in the thermal flow rate sensor according to Embodiment 1.

Figure 4:
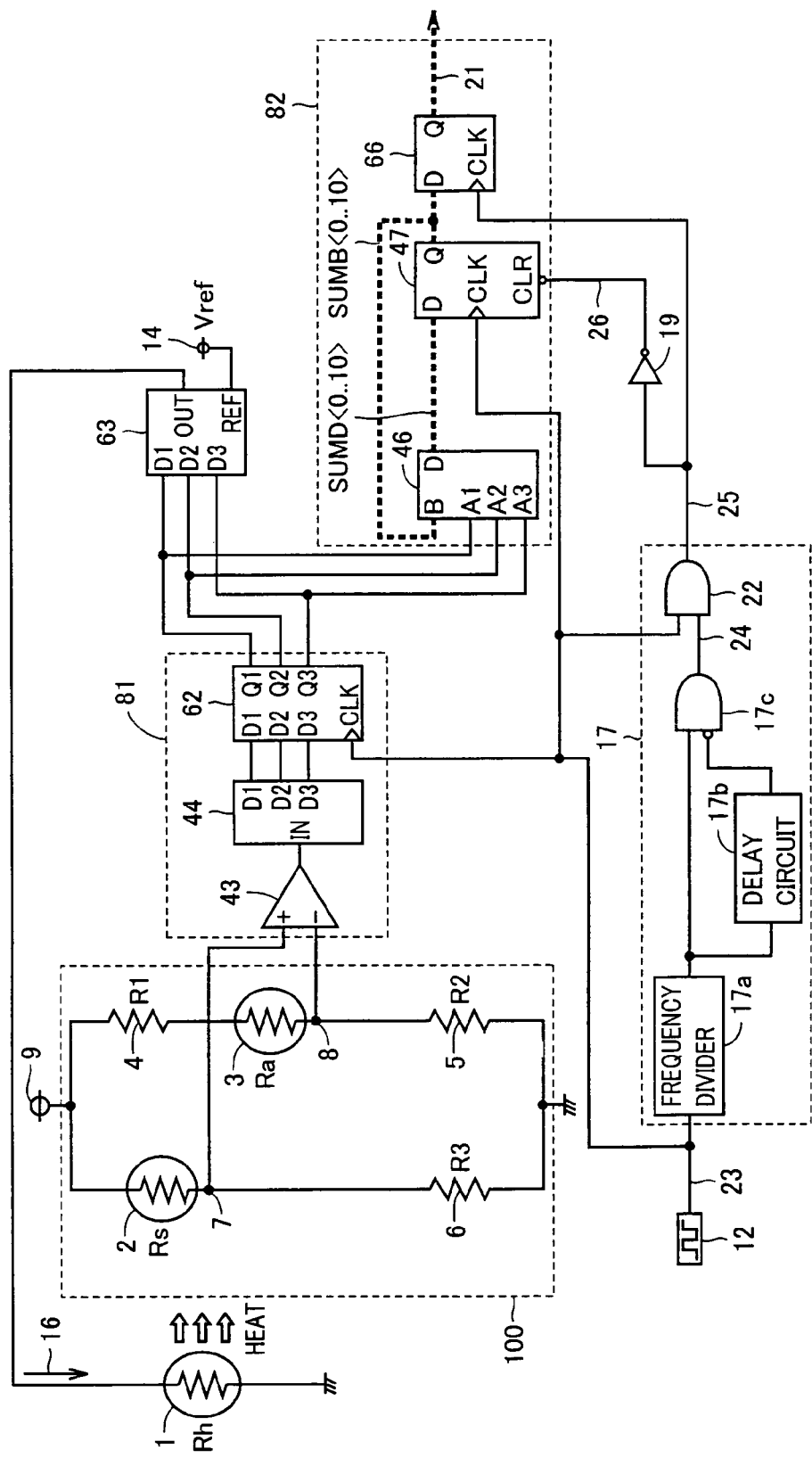
FIG. 4 is a functional block diagram showing a configuration of a thermal flow rate sensor according to Embodiment 2 of the present invention.

FIG. 4 is a functional block diagram showing a configuration of the thermal flow rate sensor according to Embodiment 2 of the present invention. Referring to FIG. 4, the thermal flow rate sensor in the present embodiment is different from the thermal flow rate sensor according to Embodiment 1 in that output operation portion 82 includes an adder 46, a flip-flop 47 and a flip-flop 66.

Adder 46 performs addition of data D1 to D3 received from flip-flop 62 and an addition result SUMB received from flip-flop 47, and outputs an addition result SUMD.

Flip-flop 47 samples and holds addition result SUMD received from adder 46 at the timing of clock 23, and outputs the held data as addition result SUMB to adder 46 and flip-flop 66. In addition, flip-flop 47 is reset at the timing of falling of update signal 26 received from inverter 19, and each bit of addition result SUMB is set to L level.

Flip-flop 66 samples and holds addition result SUMB received from flip-flop 47 at the timing of rising of update signal 25 received from AND gate 22. The held data represents the total of the heating current level in one cycle of update signal 25 and update signal 26. Then, flip-flop 66 outputs the held data as digital output 21 of the thermal flow rate sensor.

Update signal 26 falls immediately after flip-flop 66 outputs digital output 21 at the timing of rising of update signal 25, and each bit of addition result SUMB output from flip-flop 47 is set to L level. Therefore, digital output 21 is updated for each one cycle of update signal 25 and update signal 26. The output data from flip-flop 66, which is digital output 21, has 11 bits.

Therefore, in the thermal flow rate sensor according to Embodiment 2 of the present invention, as in the thermal flow rate sensor according to Embodiment 1, it is no longer necessary to provide an AD converter for converting an analog output of the sensor to a digital output, and the circuit configuration can be simplified. In addition, as digital output 21 having the resolution of 11 bits and the frequency response of 2 kHz can be obtained, the sensor output attaining high resolution and quick response can be obtained. Moreover, as digital output 21 having the resolution of 11 bits and the frequency response of 2 kHz can be obtained by using a low-speed frequency of 714 kHz as clock 23, a circuit element for low-speed operation can be used instead of a special circuit element for achieving high-speed operation, and simplified circuit configuration and reduction in manufacturing cost can be achieved. Furthermore, AD converter 44 should only have the resolution of 3 bits in order to obtain digital output 21 having the resolution of 11 bits, and complicated circuit configuration and increase in manufacturing cost due to inclusion of the AD converter attaining high resolution can be avoided. Further, as adder 46 directly adds the output data from comparison portion 81, counters 64a to 64c are not necessary in the thermal flow rate sensor according to Embodiment 2 of the present invention.

Another embodiment of the present invention will now be described with reference to the drawings. As the same or corresponding elements have the same reference characters allotted, detailed description thereof will not be repeated.

Embodiment 3

The present embodiment relates to a thermal flow rate sensor different from the thermal flow rate sensor according to Embodiment 1 in the configuration of comparison portion 81 and a method of counting outputs from comparison portion 81. The configuration and operation other than those described below are the same as in the thermal flow rate sensor according to Embodiment 1.

Figure 5:
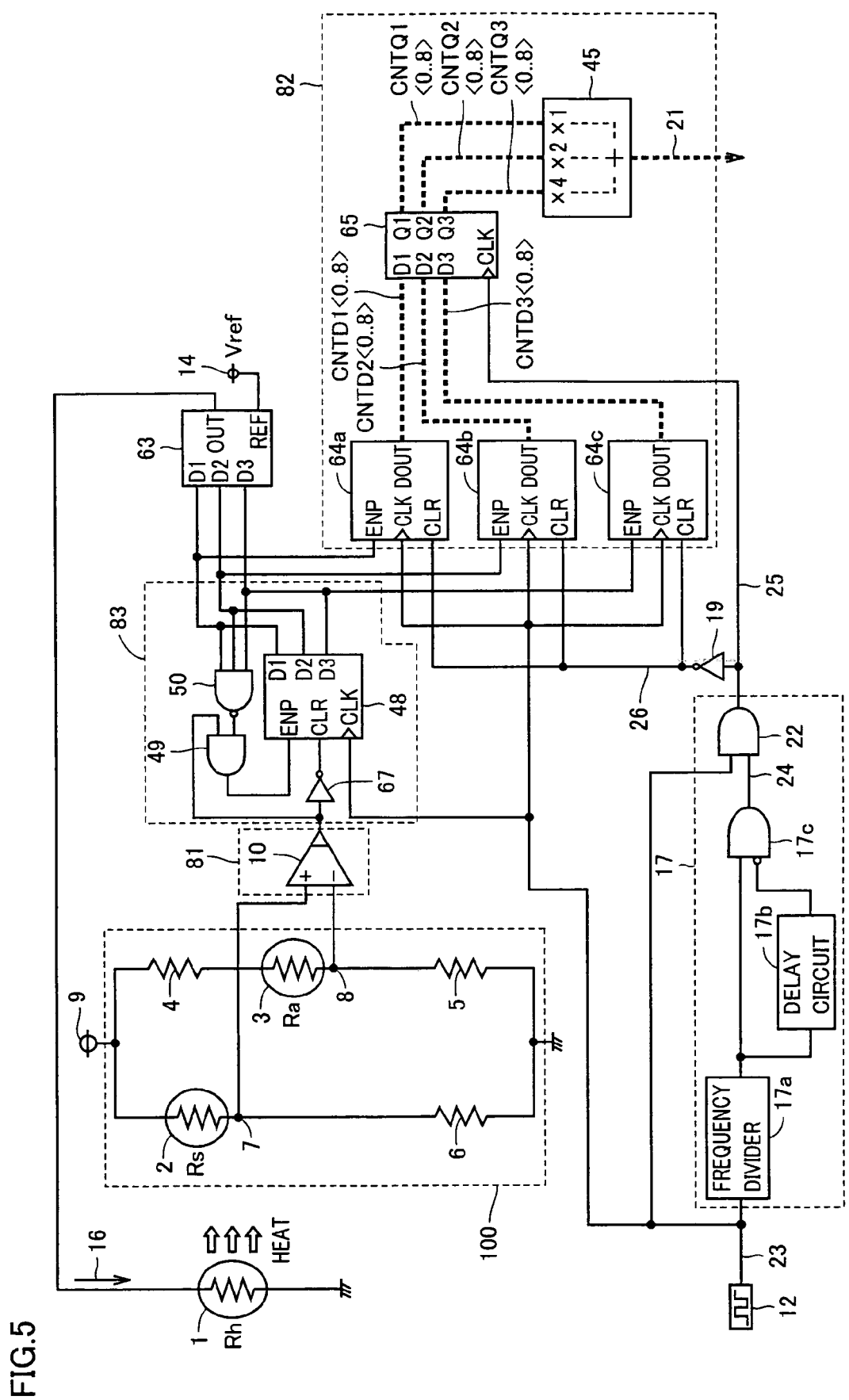
FIG. 5 is a functional block diagram showing a configuration of a thermal flow rate sensor according to Embodiment 3 of the present invention.

FIG. 5 is a functional block diagram showing a configuration of the thermal flow rate sensor according to Embodiment 3 of the present invention. Referring to FIG. 5, the thermal flow rate sensor in the present embodiment is different from the thermal flow rate sensor according to Embodiment 1 in that comparison portion 81 includes a comparator 10. Output operation portion 82 includes counters 64a to 64c, flip-flop 65 and weighting adder 45. A counter portion 83 includes a counter 48, an AND gate 49, an NAND gate 50, and an inverter 67.

Comparator 10 has a non-inverting input terminal connected to intermediate point 7 of bridge circuit 100 and an inverting input terminal connected to intermediate point 8 of bridge circuit 100. Comparator 10 compares the voltages at intermediate point 7 and intermediate point 8, and outputs data having logic level High (hereinafter, referred to as H level) or Low (hereinafter, referred to as L level) based on a result of comparison. In other words, comparator 10 outputs binary voltages corresponding to magnitude of the voltages at intermediate point 7 and intermediate point 8.

Inverter 67 inverts the logic level of the output data from comparator 10 and outputs the resultant data. Counter 48 counts the number of clocks 23. Counter 48 resets the count value when the output data from comparator 10 is set to L level. Namely, counter 48 counts duration during which the output data from comparator 10 is at H level by counting clocks 23, and outputs count results D1 to D3.

DA converter 63 converts data D1 to D3 received from counter 48 to an analog voltage based on reference voltage Vref supplied from fixed power supply 14 and supplies the resultant voltage to heat-generating resistor 1. In other words, DA converter 63 supplies the heating current to heat-generating resistor 1 based on the output from counter portion 83.

In a combination circuit constituted of AND gate 49 and NAND gate 50, when count results D1 to D3 are all set to H level, the output from NAND gate 50 is set to L level and the output from AND gate 49 is set to L level, whereby an ENP terminal of counter 48 is set to L level. When the ENP terminal is set to L level, counter 48 stops counting, and maintains the state in which count results D1 to D3 are all set to H level. That is, counter 48 stops counting if the state in which the output data from comparator 10 is set to H level continues for 7 cycles or longer of clock 23. With such a configuration, further counting of clock 23 from the state in which count results D1 to D3 are all set to H level, which leads to count results D1 to D3 all set to L level in counter 48, can be avoided. Here, as the output from counter 48 has 3 bits, the heating current varies in 8 steps.

The configuration in which output operation portion 82 calculates the total of the heating current level in one cycle of update signal 25 and outputs the result as digital output 21 is the same as in the thermal flow rate sensor according to Embodiment 1.

Figure 6A:
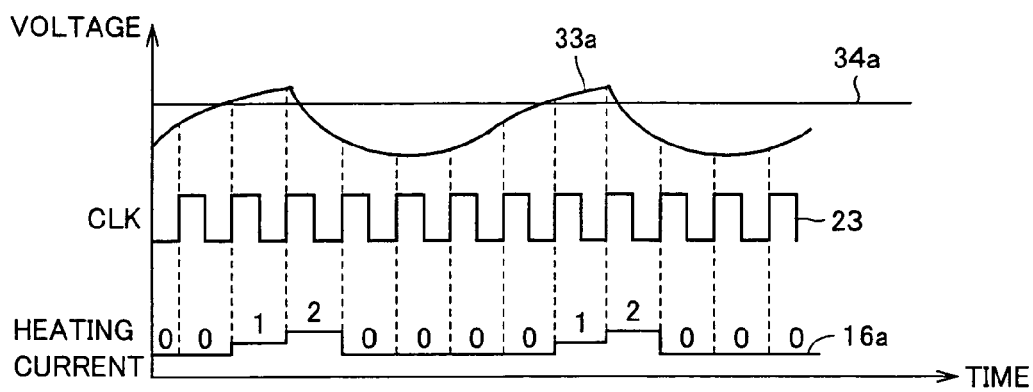
FIG. 6A shows a voltage at intermediate point 7 and intermediate point 8, clock 23 and the heating current when the flow rate is small.
Figure 6B:
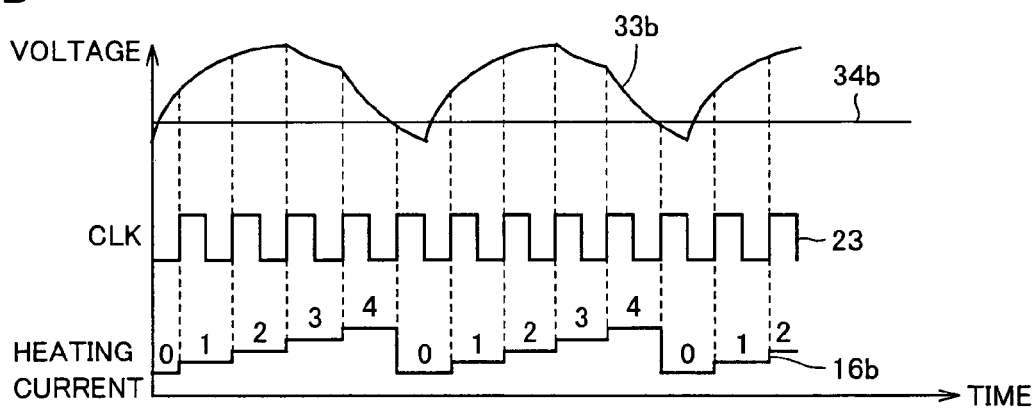
FIG. 6B shows a voltage at intermediate point 7 and intermediate point 8, clock 23 and the heating current when the flow rate is large.

FIG. 6A shows a voltage at intermediate point 7 and intermediate point 8, clock 23 and the heating current when the flow rate is small. FIG. 6B shows a voltage at intermediate point 7 and intermediate point 8, clock 23 and the heating current when the flow rate is large.

Referring to FIG. 6A, voltage 33a at intermediate point 7 fluctuates across voltage 34a at intermediate point 8: As described in connection with FIG. 3A, when the flow rate of the fluid is small, the voltage difference between intermediate point 7 and intermediate point 8 becomes smaller. Accordingly, the output data from AD converter 44 has a small value, and the heating current takes a current value represented as 0 to 2. In addition, once the temperature of heat-generating resistor 1 is raised, it takes a long time for the temperature to lower, whereby the state in which the level of the heating current is set to 0 continues for a long time.

Referring to FIG. 6B, voltage 33b at intermediate point 7 fluctuates across voltage 34b at intermediate point 8. As described in connection with FIG. 3B, when the flow rate of the fluid is large, the voltage difference between intermediate point 7 and intermediate point 8 becomes greater. Accordingly, the output data from AD converter 44 has a large value, and the heating current takes a current value represented as 0 to 4. Here, it takes a long time for the voltage difference between intermediate point 7 and intermediate point 8 to turn to negative in differential amplifier 43. On the other hand, even if the temperature of heat-generating resistor 1 is once raised, the temperature thereof is soon lowered. Namely, the state in which the level of the heating current is set to 0 ends in a short period of time.

As shown in FIG. 6A, when the flow rate of the fluid is small, the heating current in an amount of the total of 3 levels is supplied to heat-generating resistor 1 in a time period comparable to 4 cycles of clock 23. Alternatively, as shown in FIG. 6B, when the flow rate of the fluid is large, the heating current in an amount of the total of 10 levels is supplied to heat-generating resistor 1 in a time period comparable to 4 cycles of clock 23.

Here, in the thermal flow rate sensor according to Embodiment 3 of the present invention, counter 48 outputs the count result of 3 bits. Therefore, as in the thermal flow rate sensor according to Embodiment 1, the sensor output at the maximum of 7 can be obtained in one clock operation, that is, in one clock of clock 23.

Therefore, in the thermal flow rate sensor according to Embodiment 3 of the present invention, as in the thermal flow rate sensor according to Embodiment 1, it is no longer necessary to provide an AD converter for converting an analog output of the sensor to a digital output, and the circuit configuration can be simplified. In addition, as the thermal flow rate sensor according to Embodiment 3 of the present invention has the configuration of output operation portion 82 similar to that in the thermal flow rate sensor according to Embodiment 1, digital output 21 having the resolution of 11 bits and the frequency response of 2 kHz can be obtained, and the sensor output attaining high resolution and quick response can be obtained. Moreover, as digital output 21 having the resolution of 11 bits and the frequency response of 2 kHz can be obtained by using a low-speed frequency of 714 kHz as clock 23, a circuit element for low-speed operation can be used instead of a special circuit element for achieving high-speed operation, and simplified circuit configuration and reduction in manufacturing cost can be achieved.

Another embodiment of the present invention will now be described with reference to the drawings. As the same or corresponding elements have the same reference characters allotted, detailed description thereof will not be repeated.

Embodiment 4

The present embodiment relates to a thermal flow rate sensor obtained by partially combining the thermal flow rate sensors according to Embodiments 2 and 3. The configuration and operation other than those described below are the same as in the thermal flow rate sensor according to Embodiment 1.

Figure 7:
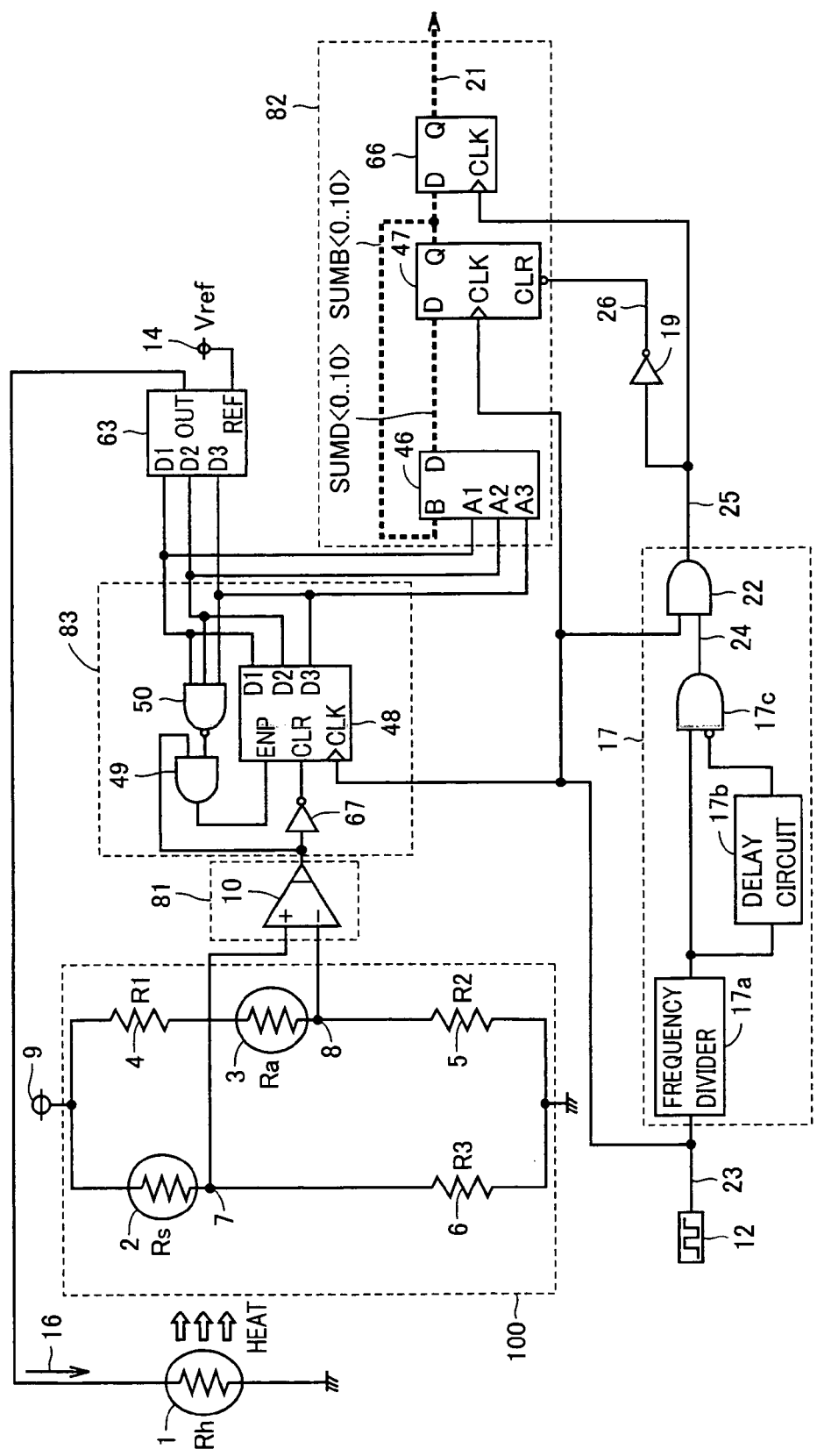
FIG. 7 is a functional block diagram showing a configuration of a thermal flow rate sensor according to Embodiment 4 of the present invention.

FIG. 7 is a functional block diagram showing a configuration of the thermal flow rate sensor according to Embodiment 4 of the present invention. Referring to FIG. 7, the configuration in which comparison portion 81 counts duration during which the output data from comparator 10 is at H level by counting clocks 23 is the same as in the thermal flow rate sensor according to Embodiment 3.

In addition, the configuration in which output operation portion 82 calculates the total of the heating current level in one cycle of update signal 25 and outputs the result as digital output 21 is the same as in the thermal flow rate sensor according to Embodiment 2.

Therefore, in the thermal flow rate sensor according to Embodiment 4 of the present invention, as in the thermal flow rate sensors according to Embodiments 2 and 3, it is no longer necessary to provide an AD converter for converting an analog output of the sensor to a digital output, and the circuit configuration can be simplified. In addition, digital output 21 having the resolution of 11 bits and the frequency response of 2 kHz can be obtained, and the sensor output attaining high resolution and quick response can be obtained. Moreover, as digital output 21 having the resolution of 11 bits and the frequency response of 2 kHz can be obtained by using a low-speed frequency of 714 kHz as clock 23, a circuit element for low-speed operation can be used instead of a special circuit element for achieving high-speed operation, and simplified circuit configuration and reduction in manufacturing cost can be achieved. Further, as adder 46 directly adds the output data from comparison portion 81, counters 64a to 64c are not necessary in the thermal flow rate sensor according to Embodiment 5 of the present invention.

Another embodiment of the present invention will now be described with reference to the drawings. As the same or corresponding elements have the same reference characters allotted, detailed description thereof will not be repeated.

Embodiment 5

The present embodiment relates to a thermal flow rate sensor suppressing temperature dependency of a sensor output. The configuration and operation other than those described below are the same as in the thermal flow rate sensor according to Embodiment 1.

[Configuration and Basic Operation]

Figure 8:
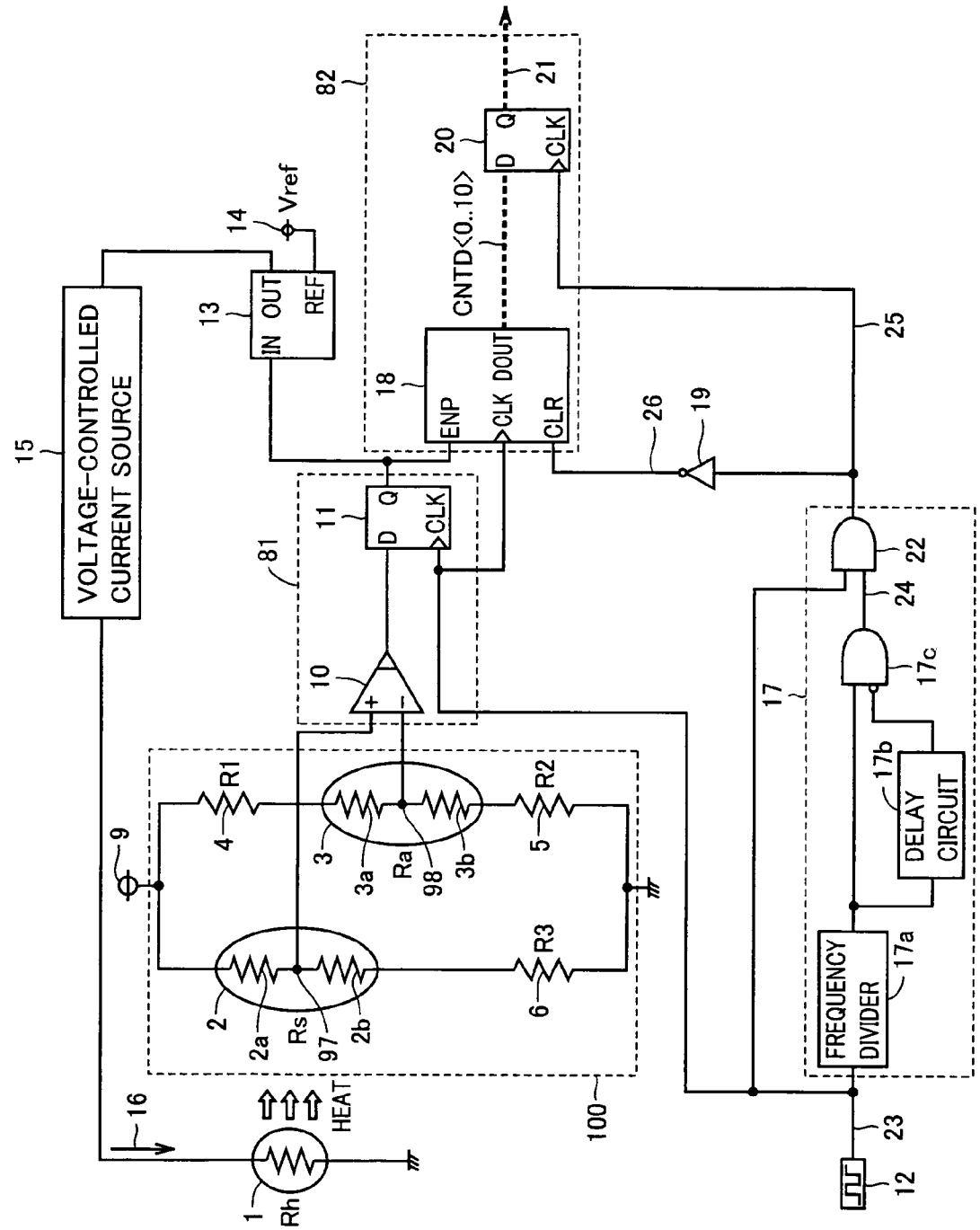
FIG. 8 is a functional block diagram showing a configuration of a thermal flow rate sensor according to Embodiment 5 of the present invention.

FIG. 8 is a functional block diagram showing a configuration of a thermal flow rate sensor according to Embodiment 5 of the present invention. Referring to FIG. 8, the thermal flow rate sensor includes heat-generating resistor 1, heating element temperature detector (first temperature detector) 2, fluid temperature detector (second temperature detector) 3, fixed-value resistors 4 to 6, fixed power supply 9, clock generator 12, a DA (Digital to Analog) converter 13, fixed power supply 14, a voltage-controlled current source 15, update signal generator 17, inverter 19, comparison portion 81, and output operation portion 82. Update signal generator 17 includes frequency divider 17a, delay circuit 17b, gate 17c, and gate 22. Comparison portion 81 includes comparator 10 and a flip-flop 11. Output operation portion 82 includes a counter 18 and a flip-flop 20.

Bridge circuit 100 is constituted of heating element temperature detector 2, fluid temperature detector 3 and fixed-value resistors 4 to 6. In the thermal flow rate sensor according to Embodiment 5 of the present invention, an intermediate point 97 of heating element temperature detector 2 corresponds to intermediate point 7 of bridge circuit 100, and an intermediate point 98 of fluid temperature detector 3 corresponds to intermediate point 8.

Comparator 10 has a non-inverting input terminal connected to intermediate point 97 of heating element temperature detector 2 and an inverting input terminal connected to intermediate point 98 of fluid temperature detector 3. Comparator 10 compares the voltages at intermediate point 97 and intermediate point 98, and outputs data of H level or L level based on a result of comparison.

Flip-flop 11 samples and holds data received from comparator 10 at the timing of clock 23 generated by clock generator 12, and outputs the held data.

DA converter 13 converts data received from flip-flop 11 to an analog voltage based on reference voltage Vref supplied from fixed power supply 14 and outputs the resultant data. Here, DA converter 13 has resolution of 1 bit.

Voltage-controlled current source 15 converts the analog voltage received from DA converter 13 to a current serving as heating current I16, and supplies the current to heat-generating resistor 1. In addition, voltage-controlled current source 15 determines the value of heating current I16 solely based on the analog voltage received from DA converter 13, and the value of heating current I16 is not affected by variation in the resistance value of heat-generating resistor 1. Therefore, while the output voltage from DA converter 13 is constant, the value of heating current I16 is maintained constant except for fluctuation due to disturbance and a noise component or the like of a circuit element.

Figure 9:
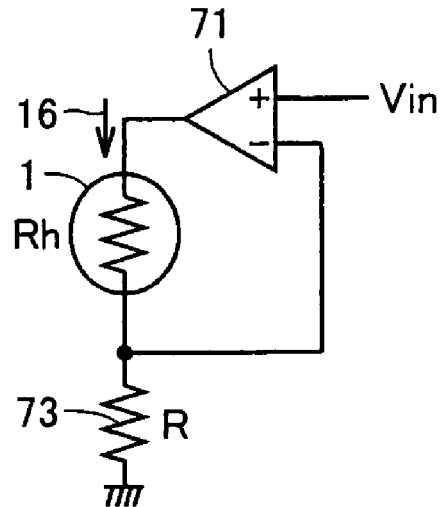
FIG. 9 is a circuit diagram showing a configuration of a voltage-controlled current source 15.

FIG. 9 is a circuit diagram showing a configuration of voltage-controlled current source 15. Referring to FIG. 9, voltage-controlled current source 15 includes a differential amplifier 71 and a resistor 73 having a resistance value R. Differential amplifier 71 has a non-inverting input terminal receiving an analog voltage Vin from DA converter 13, an inverting input terminal connected to one end of heat-generating resistor 1 and to one end of resistor 73, and an output terminal connected to the other end of heat-generating resistor 1. Resistor 73 has the other end connected to a ground potential.

Figure 10:
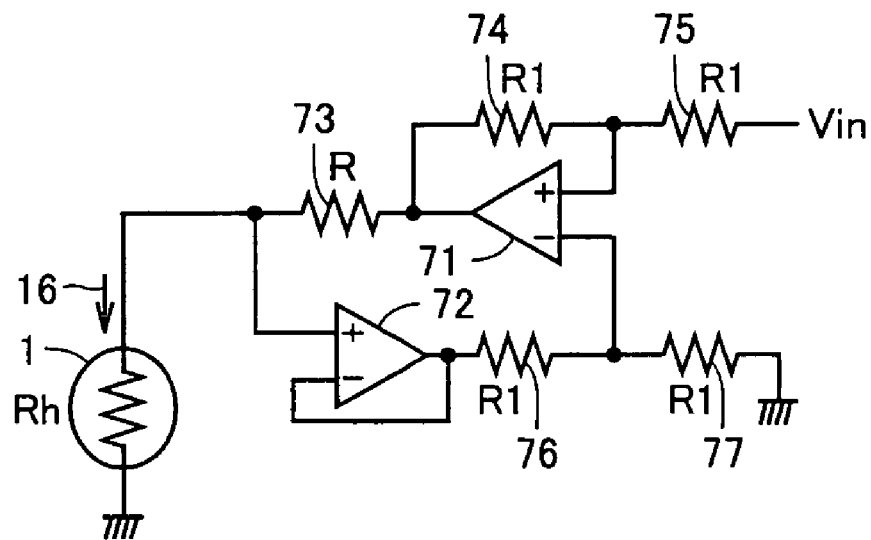
FIG. 10 is a circuit diagram showing another configuration of voltage-controlled current source 15.

FIG. 10 is a circuit diagram showing another configuration of voltage-controlled current source 15. Referring to FIG. 10, voltage-controlled current source 15 includes differential amplifier 71, a differential amplifier 72, resistor 73 having resistance value R, and resistors 74-77 each having a resistance value R1. Differential amplifier 71 has a non-inverting input terminal connected to one end of resistor 74 and to one end of resistor 75, an inverting input terminal connected to one end of resistor 76 and to one end of resistor 77, and an output terminal connected to the other end of resistor 74 and to one end of resistor 73. Differential amplifier 72 has a non-inverting input terminal connected to the other end of resistor 73 and to one end of heat-generating resistor 1, and an inverting input terminal connected to its output terminal and to the other end of resistor 76. The other end of heat-generating resistor 1 and the other end of resistor 77 are connected to the ground potential. The other end of resistor 71 receives analog voltage Vin from DA converter 13.

In the configuration of any of FIGS. 9 and 10, differential amplifier 71 implements a negative feedback circuit. Therefore, heating current I16 supplied to heat-generating resistor 1 attains to Vin/R regardless of the resistance value of heat-generating resistor 1. Namely, even if the resistance value of heat-generating resistor 1 varies depending on the temperature or the like, heating current I16 is maintained at a current value based on analog voltage Vin.

Referring again to FIG. 4, counter 18 counts the number of clocks 23 while the data received from flip-flop 11 is at H level. In addition, upon receiving update signal 26 from inverter 19, counter 18 clears the count value of clock 23 at the timing of falling of update signal 26.

Flip-flop 20 samples and holds the count result received from counter 18 at the timing of rising of update signal 25 received from update signal generator 17, and outputs the held data as digital output 21 of the thermal flow rate sensor.

Referring again to FIG. 2, counter 18 clears the count value of clock 23 at the timing of falling of update signal 26. Flip-flop 20 samples and holds the count result received from counter 18 at the timing of rising of update signal 25, that is, at the timing immediately before counter 18 clears the count value of clock 23, and outputs the held data as digital output 21 of the thermal flow rate sensor.

The structure of a detection portion of the thermal flow rate sensor according to Embodiment 5 of the present invention will now be described.

Figure 11:
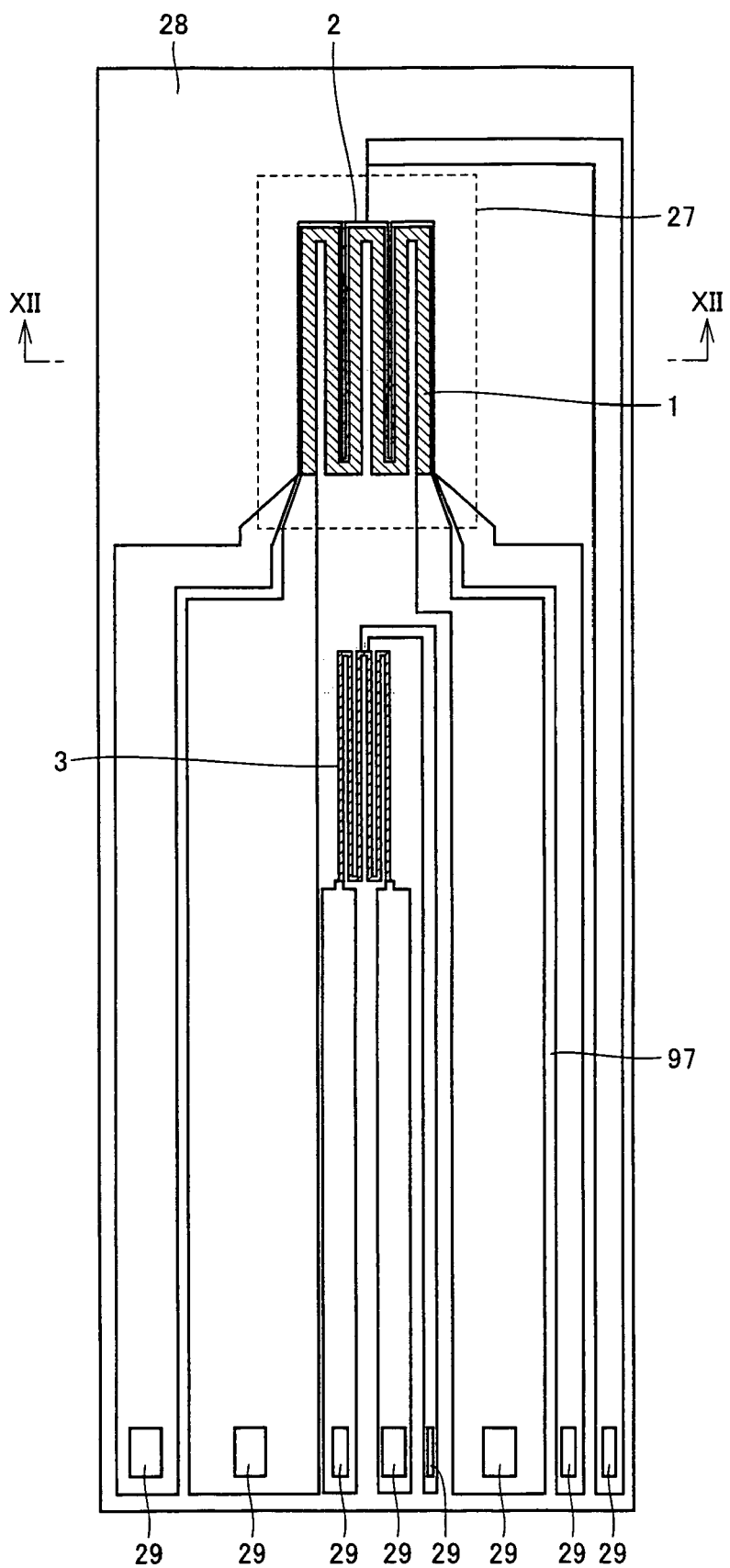
FIG. 11 is a plan view of a detection portion of the thermal flow rate sensor according to Embodiment 5 of the present invention.
Figure 12:
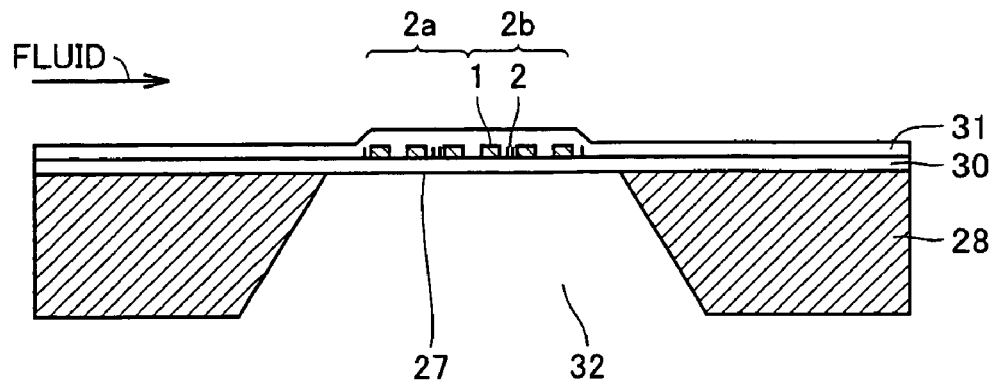
FIG. 12 is a cross-sectional view along the line XII-XII in FIG. 11.
Figure 13:
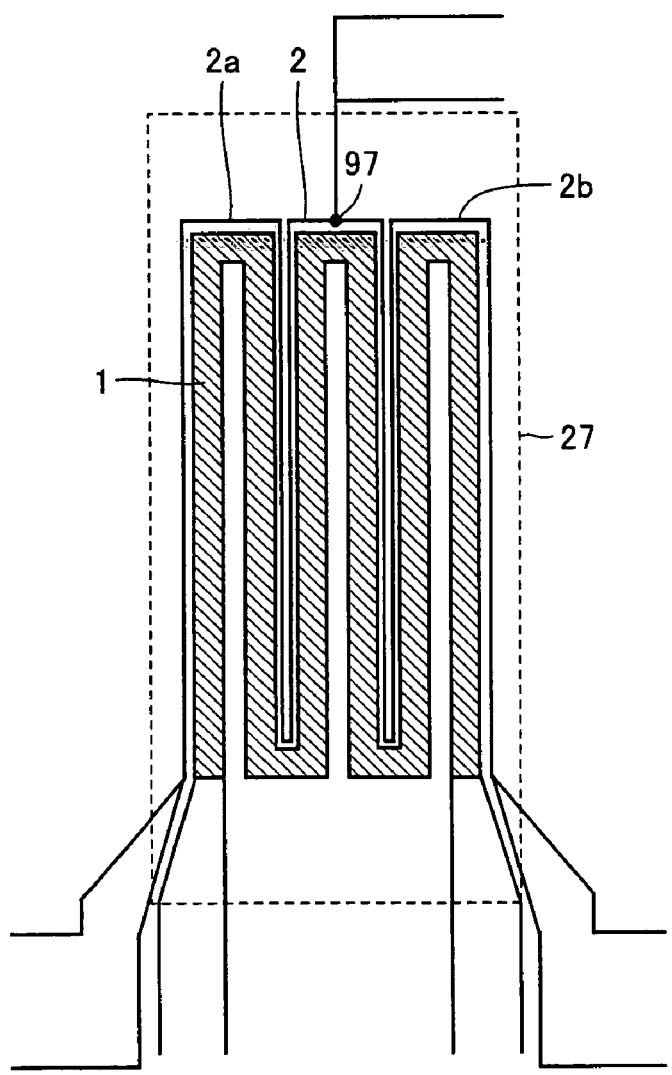
FIG. 13 is an enlarged view of a heat-generating resistor 1 and a heating element temperature detector 2 and the surroundings.
Figure 14:
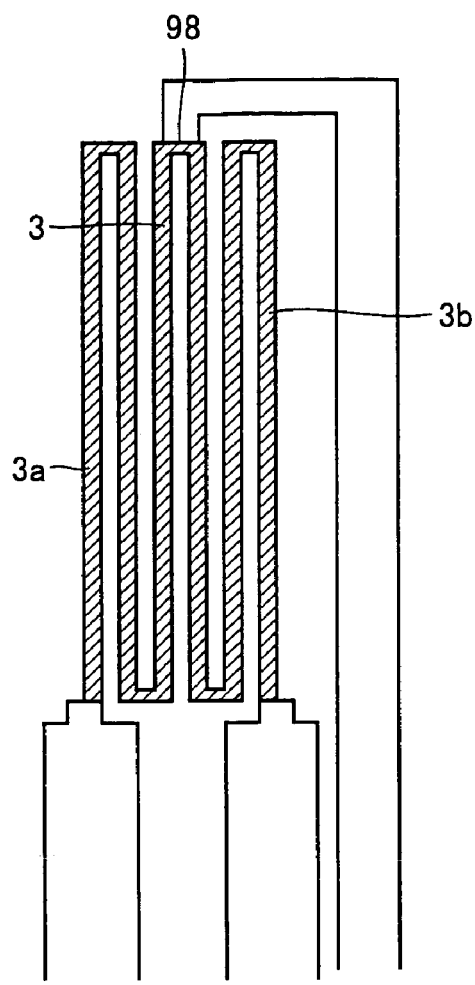
FIG. 14 is an enlarged view of a fluid temperature detector 3 and the surroundings.

FIG. 11 is a plan view of the detection portion of the thermal flow rate sensor according to Embodiment 5 of the present invention. FIG. 12 is a cross-sectional view along the line XII-XII in FIG. 11. It is noted that FIG. 12 shows a dimension of the line XII-XII in FIG. 11 enlarged to some extent. FIG. 13 is an enlarged view of heat-generating resistor 1 and heating element temperature detector 2 and the surroundings. FIG. 14 is an enlarged view of fluid temperature detector 3 and the surroundings.

Referring to FIG. 12, an insulating film 30 is formed on a silicon substrate 28. A part of the silicon substrate on the back side of insulating film 30 is etched away, to form a diaphragm 27. Heat-generating resistor 1 and heating element temperature detector 2 made of a thermosensitive resistance material having a positive temperature coefficient, such as platinum, are formed on diaphragm 27. The surfaces of heat-generating resistor 1 and heating element temperature detector 2 are protected by an insulating film 31.

Referring to FIG. 11, fluid temperature detector 3 is formed at a position less likely to be affected by the heat from heat-generating resistor 1, with a material and a method the same as those used for heat-generating resistor 1 and heating element temperature detector 2.

Referring to FIG. 13, wires extend from opposing ends and intermediate point 97 of heat-generating resistor 1 and heating element temperature detector 2, and the wires are connected to each circuit in FIG. 8 through a pad 29 formed at the end thereof shown in FIG. 11.

Referring to FIG. 14, wires extend from opposing ends and intermediate point 98 of fluid temperature detector 3, and the wires are connected to each circuit in FIG. 8 through pad 29 formed at the end thereof shown in FIG. 11.

Figure 15:
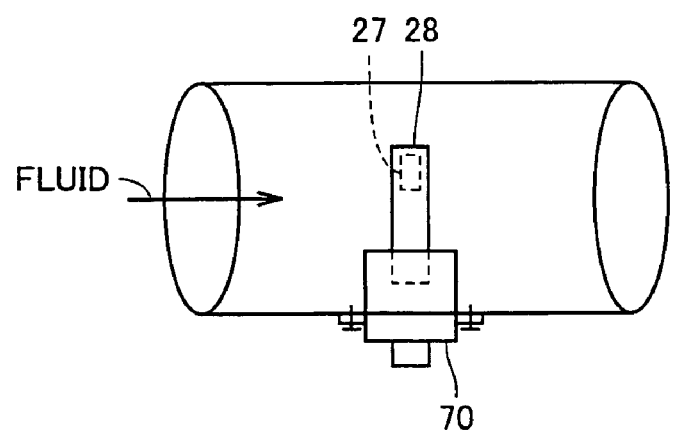
FIG. 15 illustrates a manner of attachment of the thermal flow rate sensor according to Embodiment 5 of the present invention.

FIG. 15 illustrates a manner of attachment of the thermal flow rate sensor according to Embodiment 5 of the present invention. Referring to FIG. 15, the thermal flow rate sensor is attached to a sensor support portion 70 (an attachment member such as a holder) provided in a pipe or the like through which the fluid flows, in such a manner that the substrate surface of silicon substrate 28 extends along the direction of flow of the fluid, that is, such that the substrate surface is in parallel to the streamline. Here, orientation of the thermal flow rate sensor is determined such that an upstream portion 2a of heating element temperature detector 2 formed in diaphragm (small thickness portion) 27 is positioned on a side upstream with respect to the direction of flow and a downstream portion 2b of heating element temperature detector 2 is positioned on a side downstream with respect to the direction of flow.

[Operation]

An operation of the thermal flow rate sensor according to Embodiment 5 of the present invention will now be described. Referring to FIG. 12, when the fluid flows from a direction shown with an arrow in FIG. 12, the resistance value of upstream portion 2a of heating element temperature detector 2 becomes smaller than that of downstream portion 2b, because upstream portion 2a is cooled more readily than downstream portion 2b.

Referring again to FIG. 8, when the resistance value of upstream portion 2a becomes smaller than that of downstream portion 2b, the voltage at intermediate point 97 of heating element temperature detector 2 is raised, and the output data from comparator 10 is set to H level.

Flip-flop 11 samples and holds data at H level received from comparator 10 at the timing of rising of clock 23, and outputs the held data at H level.

DA converter 13 converts the data at H level received from flip-flop 11 to an analog voltage (hereinafter, also referred to as H voltage) based on reference voltage Vref supplied from fixed power supply 14 and outputs the resultant voltage.

Voltage-controlled current source 15 converts the H voltage received from DA converter 13 to a corresponding current (hereinafter, also referred to as the current at H level or the H current) and supplies the resultant current to heat-generating resistor 1.

When the H current is supplied to heat-generating resistor 1, an amount of heat generated by heat-generating resistor 1 is increased and the temperature of heat-generating resistor 1 is raised. When the temperature of heat-generating resistor 1 is raised, the temperature of heating element temperature detector 2 located in the vicinity of heat-generating resistor 1 is also raised and the voltage at intermediate point 97 is lowered. While the voltage at intermediate point 97 is higher than that at intermediate point 98 of fluid temperature detector 3, supply of the H current to heat-generating resistor 1 continues.

When the voltage at intermediate point 97 becomes lower than that at intermediate point 98, the output data from comparator 10 is set to L level and flip-flop 11 outputs data of L level to DA converter 13. DA converter 13 converts the data at L level received from flip-flop 11 to a corresponding analog voltage (hereinafter, also referred to as L voltage) and outputs the resultant voltage.

Voltage-controlled current source 15 converts the L voltage received from DA converter 13 to a corresponding current (hereinafter, also referred to as the current at L level or the L current) and supplies the resultant current to heat-generating resistor 1. Here, as DA converter 13 has 1 bit, the L current is set to 0A.

As the current supplied from voltage-controlled current source 15 is set to 0A, heat-generating resistor 1 does not generate heat and its temperature is lowered. When the temperature of heat-generating resistor 1 is lowered, the temperature of heating element temperature detector 2 located in the vicinity of heat-generating resistor 1 is also lowered and the voltage at intermediate point 97 is raised. While the voltage at intermediate point 97 is lower than that at intermediate point 98, the heating current remains at 0A.

Figure 16A:
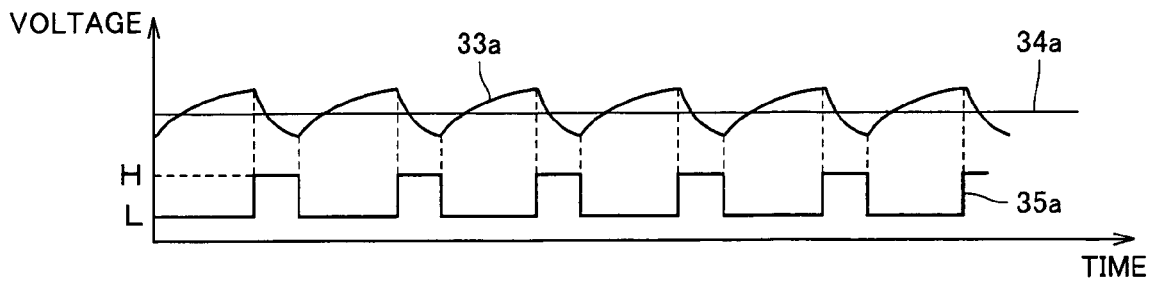
FIG. 16A shows a voltage at an intermediate point 97 and an intermediate point 98 and an output from a comparator 10 when the flow rate is small.
Figure 16B:
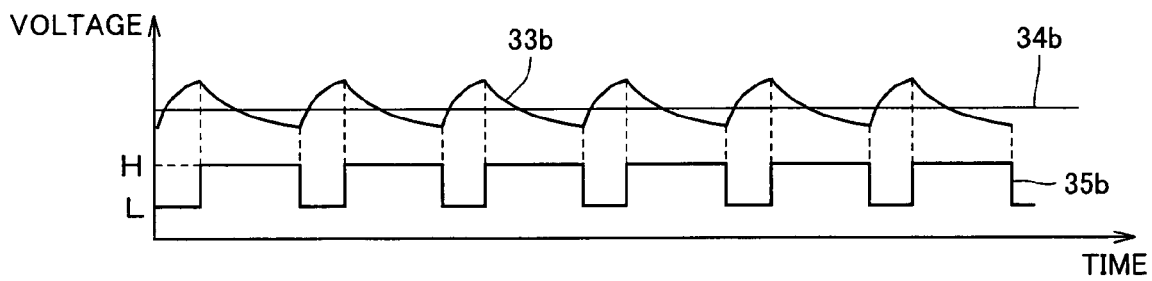
FIG. 16B shows a voltage at intermediate point 97 and intermediate point 98 and the output from comparator 10 when the flow rate is large.

FIG. 16A shows a voltage at intermediate point 97 and intermediate point 98 and the output from comparator 10 when the flow rate is small. FIG. 16B shows a voltage at intermediate point 97 and intermediate point 98 and the output from comparator 10 when the flow rate is large.

Referring to FIG. 16A, voltage 33a at intermediate point 97 fluctuates across voltage 34a at intermediate point 98. When the flow rate of the fluid is small, the amount of heat dissipation from heat-generating resistor 1 to the fluid becomes smaller. Then, the temperature of heat-generating resistor 1 is raised in a short heating time period, and once the temperature of heat-generating resistor 1 is raised, it takes a long time for the temperature to lower. Therefore, the time period during which the L current is supplied from voltage-controlled current source 15 to heat-generating resistor 1 becomes longer. Namely, the time period during which an output 35a from comparator 10 is at H level is short, while the time period during which it is at L level is long.

Referring to FIG. 16B, voltage 33b at intermediate point 97 fluctuates across voltage 34b at intermediate point 98. When the flow rate of the fluid is large, the amount of heat dissipation from heat-generating resistor 1 to the fluid becomes larger. Then, a long heating time period is necessary for raising the temperature of heat-generating resistor 1, and even if the temperature of heat-generating resistor 1 is raised once, it is lowered in a short period of time. Therefore, the time period during which the H current is supplied from voltage-controlled current source 15 to heat-generating resistor 1 becomes longer. Namely, the time period during which an output 35b from comparator 10 is at H level is long, while the time period during which it is at L level is short.

Therefore, the flow rate of the fluid for a prescribed period can be detected by counting a time during which the output data from comparator 10 is at H level or L level in the prescribed time period, that is, by counting a time during which an amount of the heating current is equal to or larger than a prescribed value (the heating current is the H current) in the prescribed time period.

As described previously, counter 18 counts the number of clocks 23 while the data received from flip-flop 11, that is, the output data from comparator 10, is at H level. In addition, counter 18 clears the count value of clock 23 at the timing of falling of update signal 26. Here, the count value immediately before counter 18 is cleared serves as digital output 21 indicating the flow rate of the fluid.

In the following, description will be given assuming that clock 23 has a frequency of 5 MHz and update signal 25 has a frequency of 2 kHz.

As counter 18 counts clock 23 of 5 MHz for a cycle of update signal 25 of 2 kHz, that is, a cycle of 0.5 msec, counter 18 can count 2500 clocks at the maximum. Therefore, the thermal flow rate sensor according to Embodiment 5 of the present invention can obtain digital output 21 having the resolution of 11 bits and the frequency response of 2 kHz.

It is assumed that the number of clocks counted during a time period t at a certain flow rate is denoted as N. Here, t represents the cycle of update signal 25, that is, a clock count time period of counter 18 (0.5 msec in the present embodiment). Digital output 21 of the thermal flow rate sensor according to Embodiment 5 of the present invention is determined based on clock count value N.

Assuming that the cycle of clock 23, that is, the cycle of the clock counted by counter 18, is denoted as tc (0.2 μsec in the present embodiment), a time $t_H$ during which the heating current supplied to heat-generating resistor 1 by voltage-controlled current source 15 is set to H level ($I_H$) is expressed by the equation below.

$$t_H = N \cdot t_c \tag{1}$$

Meanwhile, a time $t_L$ during which the heating current is set to L level ($I_L$) is expressed by the equation below.

$$t_L = \left(\frac{t}{t_c} - N\right) \cdot t_c \tag{2}$$

Here, assuming that the resistance value of heat-generating resistor 1 is denoted as Rh, heat-generation energy Eh generated by heat-generating resistor 1 during time t in a steady state is expressed by the equation below.

$$E_h = R_h \cdot I_H^2 \cdot t_H + R_h \cdot I_L^2 \cdot t_L \tag{4}$$
$$= R_h \cdot I_H^2 N \cdot t_c + R_h \cdot I_L^2 \left(\frac{t}{t_c} - N\right) \cdot t_c$$

Assuming that a heat dissipation coefficient is denoted as H and a temperature difference between heat-generating resistor 1 and the fluid is denoted as ΔTh, energy Ec taken from heat-generating resistor 1 to the outside is expressed by the equation below.

$$Ec = H \cdot \Delta T_h \cdot t \tag{5}$$

As Eh is equal to Ec (Eh=Ec) in the steady state, the following equation holds.

$$R_h \cdot I_H^2 N \cdot t_c + R_h \cdot I_L^2 \left(\frac{t}{t_c} - N\right) \cdot t_c = H \cdot \Delta T_h \cdot t \tag{6}$$

$$R_h \cdot I_H^2 N + R_h \cdot I_L^2 \left(\frac{t}{t_c} - N\right) = H \cdot \Delta T_h \cdot \frac{t}{t_c} \tag{7}$$

$$R_h \cdot (I_H^2 - I_L^2) N = (H \cdot \Delta T_h - R_h \cdot I_L^2) \frac{t}{t_c} \tag{8}$$

Solving Equation (8) with regard to N, N is expressed in the following equation.

$$N = \frac{H \cdot \Delta T_h - R_h \cdot I_L^2}{R_h \cdot (I_H^2 - I_L^2)} \cdot \frac{t}{t_c} \tag{9}$$

$$= \frac{1}{I_H^2 - I_L^2} \left(\frac{H \cdot \Delta T_h}{R_h} - I_L^2\right) \frac{t}{t_c} \tag{10}$$

Here, in the thermal flow rate sensor according to Embodiment 5 of the present invention, the current pulse is supplied to heat-generating resistor 1 by voltage-controlled current source 15, and therefore, digital control is carried out in the thermal flow rate sensor. Considering in a time-average manner, however, it can be considered that bridge circuit 100 shown in FIG. 8 is in a balanced state.

Therefore, assuming that the resistance value of upstream portion 2a of heating element temperature detector 2 is denoted as Rsu, the resistance value of downstream portion 2b thereof is denoted as Rsd, the resistance of an upstream portion 3a of fluid temperature detector 3 is denoted as Rau, the resistance of a downstream portion 3b thereof is denoted as Rad, and the resistance values of fixed-value resistors 4, 5 and 6 are denoted as R1, R2 and R3 respectively, the following equation holds based on a balance equation of the bridge circuit.

$$R_{su} = \frac{(R_1 + R_{au})(R_3 + R_{sd})}{R_2 + R_{ad}} \tag{11}$$

When the temperature of the fluid is constant, Rsu is expressed in the following equation.

$$R_{su} = C \cdot (R_3 + R_{sd}) \qquad C = \frac{R_1 + R_{au}}{R_2 + R_{ad}} = const \tag{12}$$

Assuming that a ratio of resistance between upstream portion 2a and downstream portion 2b of heating element temperature detector 2 is denoted as r, r is expressed in the following equation.

$$r = \frac{R_{sd}}{R_{su}} \tag{13}$$

When Equation (13) is substituted into Equation (11) and solved with regard to Rsu, Rsu is expressed in the following equation.

$$R_{su} = \frac{C \cdot R_3}{1 - C \cdot r} \tag{14}$$

Figure 17:
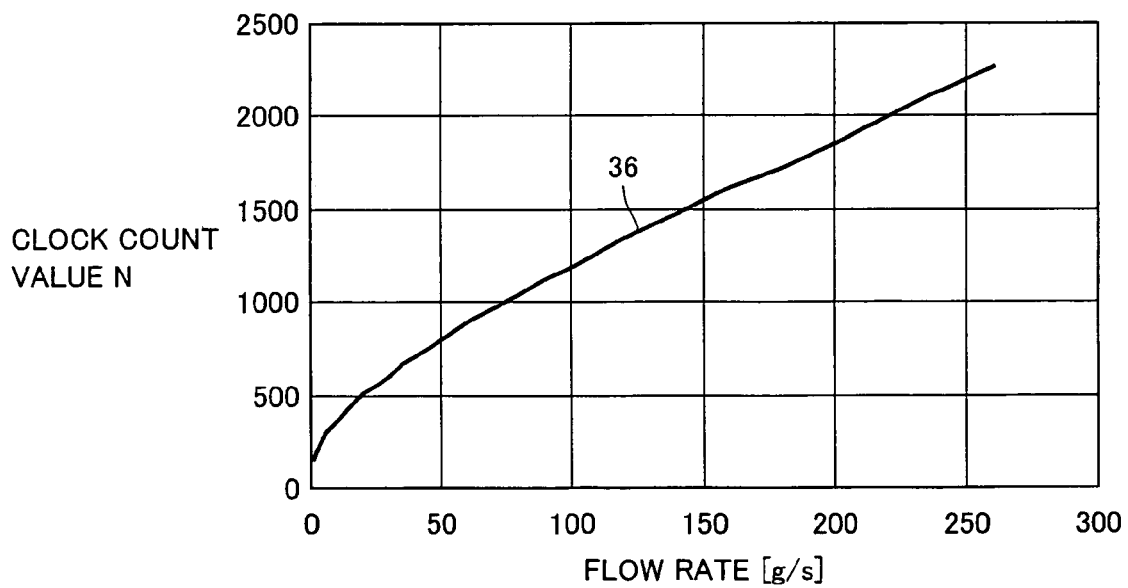
FIG. 17 is a graph showing flow rate dependency of a clock count value N calculated through simulation.
Figure 18:
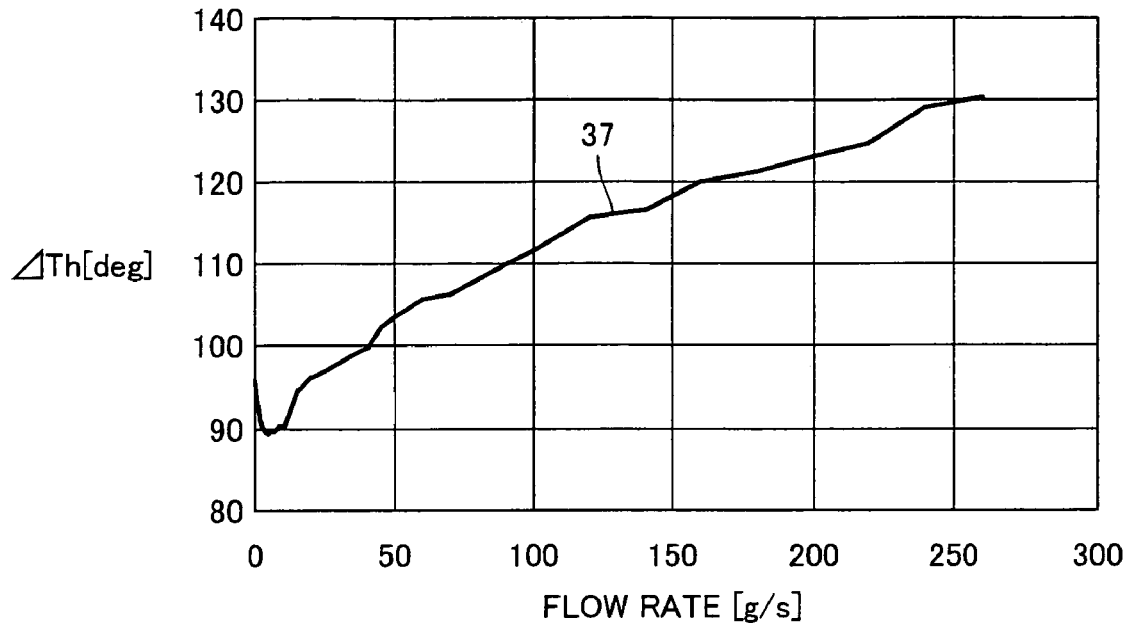
FIG. 18 is a graph showing flow rate dependency of $\Delta Th$ calculated through simulation.

FIG. 17 is a graph showing flow rate dependency of clock count value N calculated through simulation. FIG. 18 is a graph showing flow rate dependency of ΔTh calculated through simulation.

As upstream portion 2a is cooled more readily than downstream portion 2b, r becomes larger as the flow rate is greater. Therefore, it can be seen from Equation (14) that, with the increase in the flow rate of the fluid, Rsu becomes greater and the temperature of heat-generating resistor 1 is raised.

More specifically, when the flow rate of the fluid is increased in the steady state, that is, while bridge circuit 100 is in the balanced state, Rsu once lowers. When Rsu is smaller than Rsd, bridge circuit 100 is no longer in the balanced state. Namely, the voltage at intermediate point 97 of heating element temperature detector 2 is raised, and the voltage at intermediate point 97 becomes higher than that at intermediate point 98. Then, the output data from comparator 10 is set to H level, DA converter 13 outputs the H voltage, and voltage-controlled current source 15 supplies the H current to heat-generating resistor 1. When the H current is supplied to heat-generating resistor 1, the amount of heat generation of heat-generating resistor 1 is increased and the temperature of heat-generating resistor 1 is raised. The temperature of heating element temperature detector 2 is raised through heating by heat-generating resistor 1, and Rsu and Rsd are increased because heating element temperature detector 2 has a positive temperature coefficient.

Here, with the increase of Rsd along with Rsu, voltage lowering at intermediate point 97 due to the increase of Rsu is partially cancelled by the increase of Rsd, and the unbalanced state of bridge circuit 100 continues. Namely, the state in which the voltage at intermediate point 97 is higher than that at intermediate point 98 continues, and voltage-controlled current source 15 continues to supply the H current to heat-generating resistor 1. The temperature of heat-generating resistor 1 is further raised, and the temperature of heating element temperature detector 2 is further raised through heating by heat-generating resistor 1. Here, Rsu becomes greater than before the increase in the flow rate of the fluid, and bridge circuit 100 returns to the balanced state. In this manner, when the flow rate of the fluid is increased, clock count value N becomes greater as shown in FIG. 17 and ΔTh becomes greater as shown in FIG. 18.

The temperature characteristic of clock count value N will now be described.

In Equation (10), t and tc are predetermined and constant, regardless of the temperature. In addition, as voltage-controlled current source 15 can maintain the heating current constant regardless of variation in the temperature of heat-generating resistor 1, that is, regardless of variation in the resistance value of heat-generating resistor 1 as described previously, IH and IL are constant regardless of the temperature. On the other hand, H●ΔTh/Rh has the temperature characteristic. Therefore, the temperature characteristic of clock count value N is dependent on H●ΔTh/Rh.

Here, a temperature coefficient αH of heat dissipation coefficient H is determined based on the sum of the coefficient of heat dissipation to the fluid and the coefficient of heat dissipation to sensor support portion 70. Specifically, if it is assumed that the coefficient of heat dissipation to the fluid is denoted as Hv, the temperature coefficient of Hv is denoted as αv, the coefficient of heat dissipation to sensor support portion 70 is denoted as Hd, and the temperature coefficient of Hd is denoted as αd, temperature coefficient αH of heat dissipation coefficient H is expressed in the following equation.

$$\alpha H = \frac{H_v}{H}\alpha_v + \frac{H_d}{H}\alpha_d \tag{15}$$

Here, if air is employed as the fluid, αv takes a positive value, and αd may take a positive or negative value depending on a material for sensor support portion 70. In the thermal flow rate sensor having a structure shown in FIGS. 11 and 12, relation of αd>αv>0 is established in general. Therefore, temperature coefficient αH of heat dissipation coefficient H takes a positive value, and becomes smaller with the increase in the flow rate.

If the fluid temperature is denoted as Ta, ΔTh/Rh is expressed in the following equation.

$$\frac{\Delta T_h}{R_h} = \frac{\Delta T_h}{R_{h0}(1+\alpha\Delta T_h+\alpha T_a)} \tag{16}$$

Here, in the thermal flow rate sensor according to Embodiment 5 of the present invention, bridge circuit 100 is controlled such that ΔTh hardly changes in spite of variation in fluid temperature Ta if the flow rate is constant.

More specifically, if it is assumed that a temperature difference between the fluid and upstream portion 2a of heating element temperature detector 2 is denoted as ΔTsu, a temperature difference between the fluid and downstream portion 2b of heating element temperature detector 2 is denoted as ΔTsd, values of Rsu, Rsd, Rau, and Rad when fluid temperature Ta is set to 0° C. are denoted as Rsu0, Rsd0, Rau0, and Rad0 respectively, and a resistance temperature coefficient of Rsu, Rsd, Rau, and Rad is denoted as an identical value α because heating element temperature detector 2 and fluid temperature detector 3 are made from the same material, the following equation holds based on Equation (11).

$$R_{su0}(1+\alpha\Delta T_{su}+\alpha T_a) = \tag{17}$$
$$\frac{(R_1+R_{au0}(1+\alpha T_a))(R_3+R_{sd0}(1+\alpha\Delta T_{sd}+\alpha T_a))}{R_2+R_{ad0}(1+\alpha T_a)}$$

In order for Equation (17) to hold without variation in ΔTh, that is, without variation in ΔTsu and ΔTsd, in spite of variation in fluid temperature Ta, a ratio between Ra and Rau0 should be adjusted.

Accordingly, as ΔTh/Rh becomes smaller with the increase in fluid temperature Ta in Equation (16), ΔTh/Rh has a negative temperature coefficient. Meanwhile, as ΔTh becomes greater with the increase in the flow rate as described with reference to FIG. 18, influence of Ta on ΔTh/Rh becomes relatively smaller with the increase in the flow rate. Therefore, as the flow rate is increased, the absolute value of the temperature coefficient of ΔTh/Rh becomes smaller.

Figure 19:
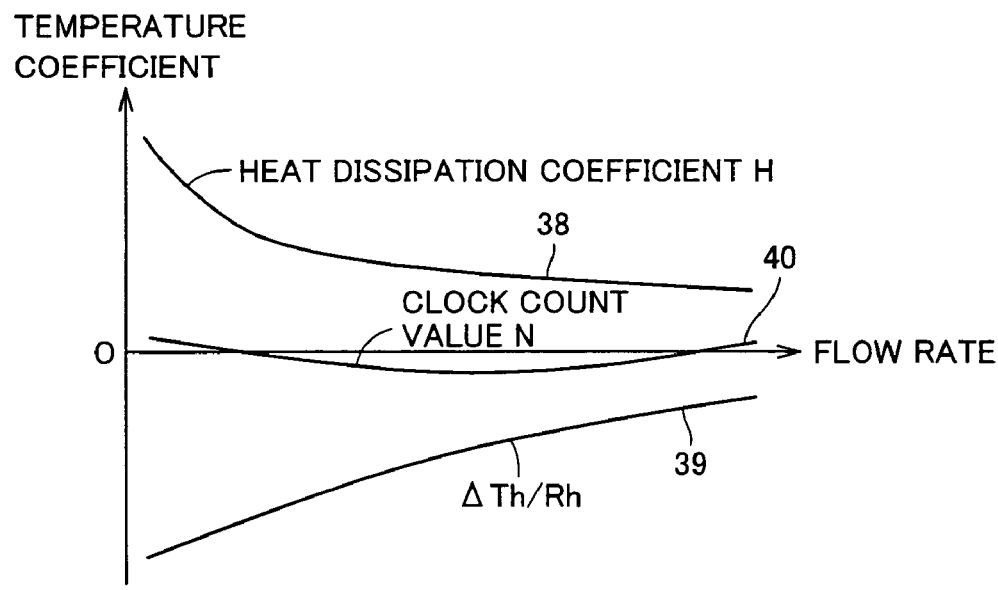
FIG. 19 illustrates flow rate dependency of a temperature coefficient of a digital output 21.

FIG. 19 illustrates flow rate dependency of a temperature coefficient of digital output 21.

Referring to FIG. 19, temperature coefficient αH of heat dissipation coefficient H has a positive value and becomes smaller with the increase in the flow rate, as described previously. Meanwhile, the temperature coefficient of ΔTh/Rh has a negative value and its absolute value becomes smaller with the increase in the flow rate. Therefore, as can be seen from Equation (10), a temperature coefficient 38 of heat dissipation coefficient H and a temperature coefficient 39 of ΔTh/Rh cancel each other, and the absolute value of a temperature coefficient 40 of clock count value N becomes very small. Therefore, the thermal flow rate sensor according to Embodiment 5 of the present invention can achieve significantly low temperature dependency of digital output 21.

Here, temperature dependency of the thermal flow rate sensors according to Embodiments 1 to 4 of the present invention, that is, the configuration without voltage-controlled current source 15, in which an analog voltage from DA converter 13 is applied to heat-generating resistor 1, will be considered.

In such a configuration, as the heating current varies in accordance with variation in the resistance value of heat-generating resistor 1, IH and IL have temperature dependency. Here, in Equation (10), if IH and IL having temperature dependency are converted to output voltages VH and VL of DA converter 13 respectively that do not have temperature dependency, that is, of which values do not vary regardless of variation in the resistance value of heat-generating resistor 1, the following equation can be obtained.

$$N = \frac{1}{\left(\frac{V_H}{Rh}\right)^2 - \left(\frac{V_L}{Rh}\right)^2}\left(\frac{H\cdot\Delta T_h}{R_h} - \left(\frac{V_L}{Rh}\right)^2\right)\frac{t}{t_c} \tag{18}$$
$$= \frac{1}{V_H^2 - V_L^2}(H\cdot\Delta T_h\cdot Rh - V_L^2)\frac{t}{t_c}$$

As can be seen from Equation (18), the term ΔTh/Rh turns into ΔTh×Rh. Namely, as temperature coefficient 38 of heat dissipation coefficient H and a temperature coefficient of ΔTh×Rh do not cancel each other, the absolute value of temperature coefficient 40 of clock count value N does not become smaller and temperature dependency of digital output 21 cannot be lowered.

Figure 20:
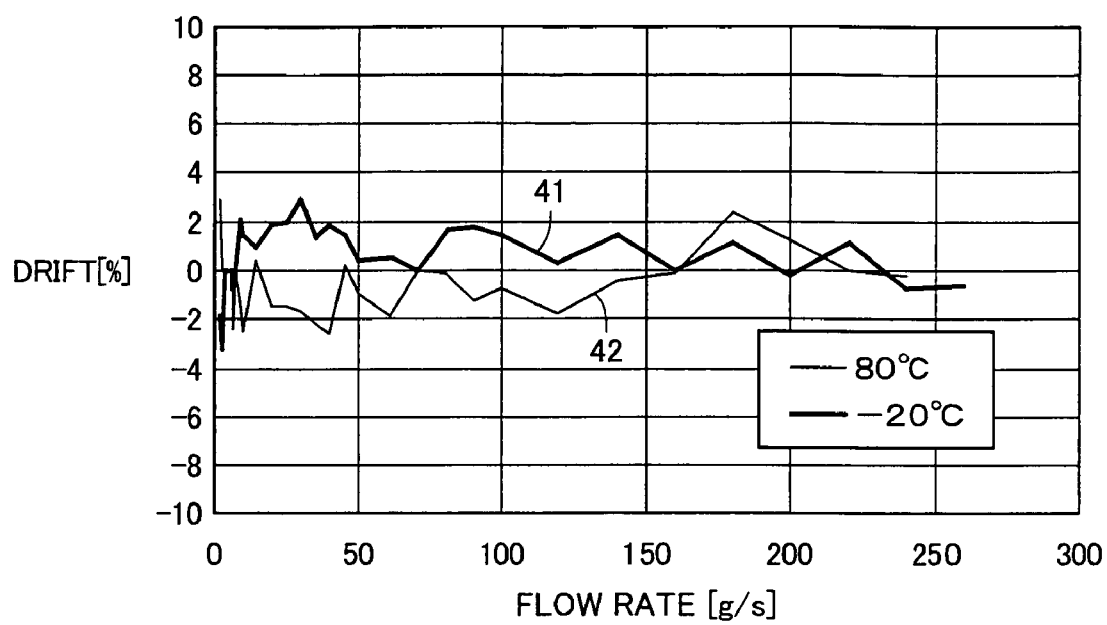
FIG. 20 shows a simulation result of a temperature characteristic of clock count value N.

FIG. 20 shows a simulation result of the temperature characteristic of clock count value N.

Referring to FIG. 20, a line shown with 41 represents a flow rate conversion drift at a temperature of −20° C., while a line shown with 42 represents a flow rate conversion drift at a temperature of 80° C.

As can be seen from FIG. 20, in the thermal flow rate sensor according to Embodiment 5 of the present invention, the flow rate conversion drift is within a range of approximately ±2% when the temperature is in a range of −20 to 80° C. and the flow rate is in a range of 0 to 250 g/s, and the excellent temperature characteristic, i.e., extremely low temperature dependency, can be obtained.

In the thermal flow rate sensor according to Embodiment 5 of the present invention, comparison portion 81 compares the voltages at intermediate point 97 of heating element temperature detector 2 and at intermediate point 98 of fluid temperature detector 3, and supplies a digital output indicating the result of comparison. Counter 18 counts the number of clocks 23 while the data received from flip-flop 11 is at H level. The count value immediately before counter 18 is cleared serves as 11-bit digital output 21 of the thermal flow rate sensor, and digital output 21 is updated for each one cycle of update signal 25 and update signal 26. According to such a configuration, as in Embodiment 1 of the present invention, it is no longer necessary to provide an AD converter for converting an analog output of the sensor to a digital output, and the circuit configuration can be simplified. In addition, as digital output 21 having the resolution of 11 bits and the frequency response of 2 kHz can be obtained, the sensor output attaining high resolution and quick response can be obtained.

No measure for suppressing the temperature dependency of the sensor output has been taken in the thermal flow rate sensors described in Patent Document 2 and Non-Patent Document 1. Though a measure for suppressing the temperature dependency of the sensor output has been taken in the thermal flow rate sensor described in Non-Patent Document 2, two thermocouples should be controlled to attain different temperatures respectively and the circuit configuration has accordingly been complicated. On the other hand, in the thermal flow rate sensor according to Embodiment 5 of the present invention, voltage-controlled current source 15 supplies the heating current to heat-generating resistor 1 based on the digital output from comparison portion 81 indicating the result of comparison, and maintains the heating current constant regardless of variation in the resistance value of heat-generating resistor 1. According to such a configuration, Equation (16) holds, temperature coefficient 38 of heat dissipation coefficient H and temperature coefficient 39 of ΔTh/Rh cancel each other, and the absolute value of temperature coefficient 40 of clock count value N becomes very small. Therefore, the thermal flow rate sensor according to Embodiment 5 of the present invention can obtain the digital output attaining high resolution and quick response as the sensor output, as well as can suppress the temperature dependency of the sensor output.

Though comparator 10 has been configured to compare the voltages at intermediate point 97 and intermediate point 98 in the thermal flow rate sensor according to Embodiment 5 of the present invention, the configuration is not limited as such. In order to obtain excellent temperature characteristic, temperature difference ΔTh between heat-generating resistor 1 and the fluid should be greater with the increase in the flow rate, and this phenomenon can be realized by a configuration in which comparator 10 compares a voltage at a portion other than both end portions and the intermediate point of heating element temperature detector 2 and a voltage at a portion other than both end portions and the intermediate point of fluid temperature detector 3. In other words, the temperature dependency of the sensor output can be suppressed by adjusting values for Rsu and Rsd such that a parameter r in Equation (14) has a greater value with the increase in the flow rate.

Though the thermal flow rate sensor according to Embodiment 5 of the present invention has been configured such that voltage-controlled current source 15 converts the analog voltage received from DA converter 13 to a current serving as heating current I16 and supplies the current to heat-generating resistor 1, the configuration is not limited as such. Even if the thermal flow rate sensor does not include DA converter 13, such a configuration that voltage-controlled current source 15 converts H level and L level of the output data from comparison portion 81 to a heating current in an appropriate amount and supplies the current to heat-generating resistor 1 may be employed. It is noted that the configuration in which the thermal flow rate sensor includes DA converter 13 is preferred, because the amount of heating current corresponding to the output data from comparison portion 81 can readily be regulated.

Another embodiment of the present invention will now be described with reference to the drawings. As the same or corresponding elements have the same reference characters allotted, detailed description thereof will not be repeated.

Embodiment 6

The present embodiment relates to a thermal flow rate sensor with increased resolution of the DA converter. The configuration and operation other than those described below are the same as in the thermal flow rate sensor according to Embodiment 5.

Figure 21:
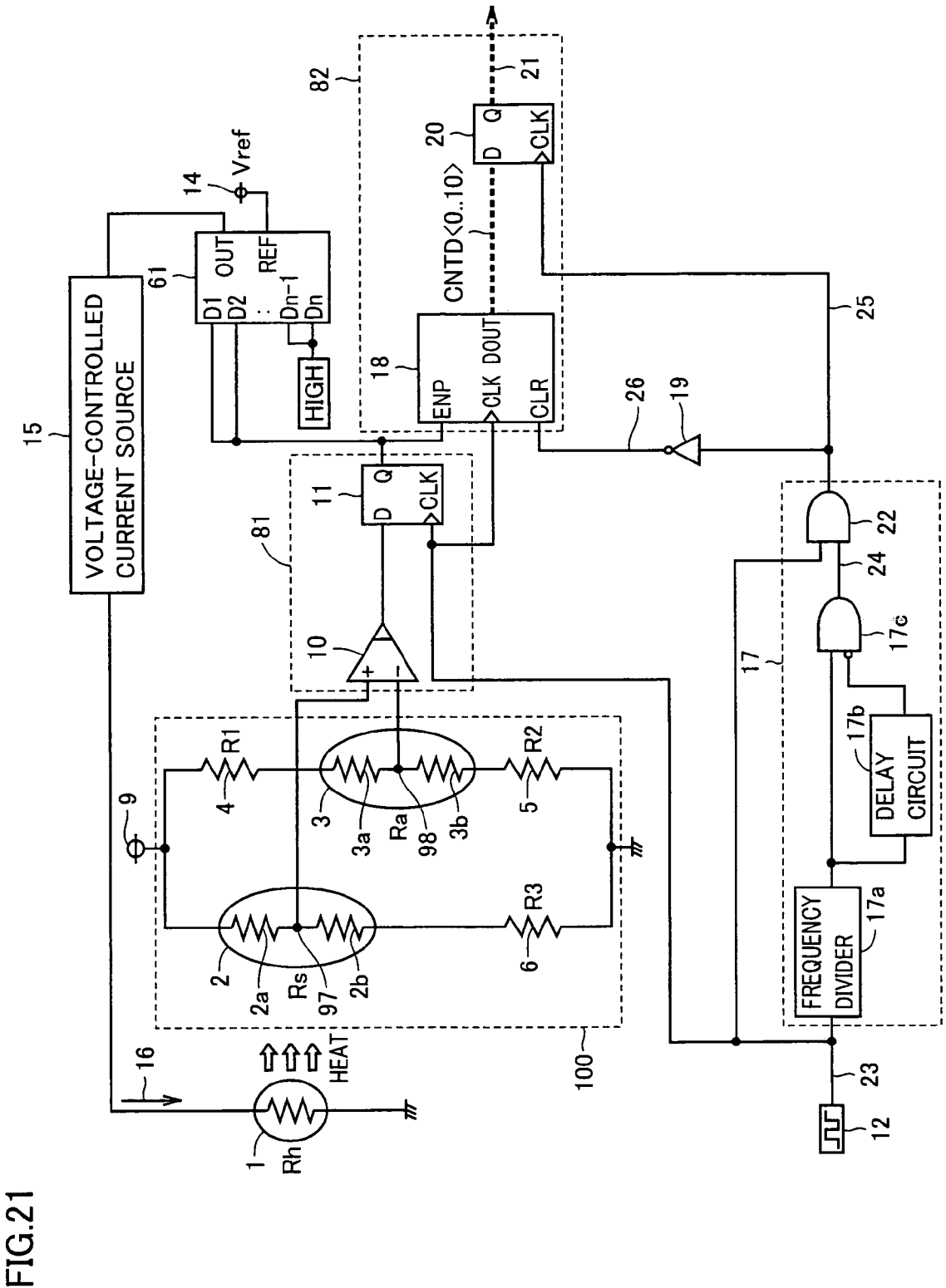
FIG. 21 is a functional block diagram showing a configuration of a thermal flow rate sensor according to Embodiment 6 of the present invention.

FIG. 21 is a functional block diagram showing a configuration of the thermal flow rate sensor according to Embodiment 6 of the present invention. Referring to FIG. 21, the thermal flow rate sensor of the present embodiment is different from the thermal flow rate sensor according to Embodiment 5 in including a DA converter 61 instead of DA converter 13.

DA converter 61 has resolution of n (n is a natural number equal to or larger than 2) bits. A terminal D1 of DA converter 61 corresponds to an MSB (Most Significant Bit), while a terminal Dn thereof corresponds to an LSB (Least Significant Bit). Flip-flop 11 has an output connected to terminal D1 and a terminal D2, and a terminal Dn−1 and a terminal Dn are connected to H level.

As described above, to which of terminals D1 to Dn the output of flip-flop 11 is connected is selected or whether the terminal not connected to the output of flip-flop 11 is connected to H level or L level is selected so that an output voltage from DA converter 61 corresponding to the result of comparison in comparator 10 can finely be regulated and current value IH of the H current and current value IL of the L current supplied from voltage-controlled current source 15 can finely be regulated. Based on Equation (10), an offset of clock count value N corresponds to the term IL2, and a gain corresponds to the term $1/(IH^2-IL^2)$. Therefore, the offset and the gain of clock count value N can be adjusted by regulating IH and IL.

Therefore, in the thermal flow rate sensor according to Embodiment 6 of the present invention, as compared with the thermal flow rate sensor according to Embodiment 5, DA converter 61 has the resolution of multiple bits, so that clock count value N, that is, the offset and the gain of digital output 21 of the thermal flow rate sensor, can further finely be adjusted, without an additional circuit.

Another embodiment of the present invention will now be described with reference to the drawings. As the same or corresponding elements have the same reference characters allotted, detailed description thereof will not be repeated.

Embodiment 7

The present embodiment relates to a thermal flow rate sensor having a configuration of comparison portion 81 and output operation unit 82 the same as in Embodiment 1, unlike the thermal flow rate sensor according to Embodiment 5 of the present invention. The configuration and operation other than those described below are the same as in the thermal flow rate sensors according to Embodiments 1 and 5.

Figure 22:
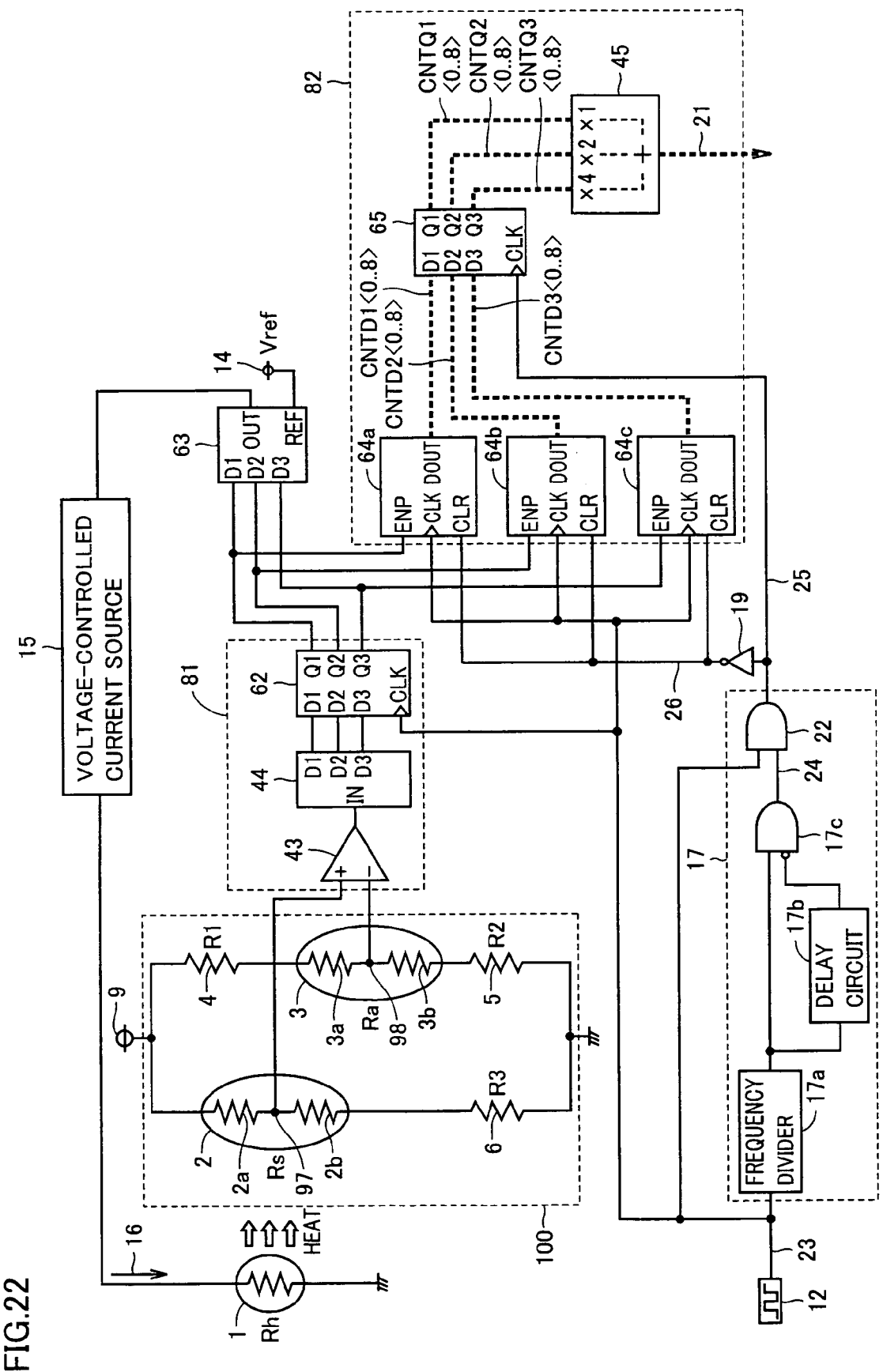
FIG. 22 is a functional block diagram showing a configuration of a thermal flow rate sensor according to Embodiment 7 of the present invention.

FIG. 22 is a functional block diagram showing a configuration of the thermal flow rate sensor according to Embodiment 7 of the present invention. Referring to FIG. 22, the thermal flow rate sensor of the present embodiment is different from the thermal flow rate sensor according to Embodiment 5 in including DA converter 63 instead of DA converter 13. Comparison portion 81 includes differential amplifier 43, AD converter 44 and flip-flop 62. Output operation portion 82 includes counters 64a to 64c, flip-flop 65 and weighting adder 45.

DA converter 63 converts data D1 to D3 received from flip-flop 62 to an analog voltage based on reference voltage Vref supplied from fixed power supply 14 and outputs the resultant voltage. DA converter 63 has the resolution of 3 bits.

When the voltage difference between intermediate point 97 and intermediate point 98 is small, the output voltage from differential amplifier 43 is small, and the current supplied from voltage-controlled current source 15 to heat-generating resistor 1 is accordingly small. When the voltage difference between intermediate point 97 and intermediate point 98 is great, the output voltage from differential amplifier 43 is large, and the current supplied from voltage-controlled current source 15 to heat-generating resistor 1 is accordingly large. As AD converter 44 has the resolution of 3 bits, the current supplied to heat-generating resistor 1 varies in 8 steps.

In the thermal flow rate sensor according to Embodiment 5 of the present invention, the sensor output at the maximum of 1 can be obtained in one clock of clock 23. In the thermal flow rate sensor according to Embodiment 7 of the present invention, however, AD converter 44 has the resolution of 3 bits, and the sensor output at the maximum of 7 can be obtained in one clock operation, that is, in one clock of clock 23. Therefore, the thermal flow rate sensor according to Embodiment 7 of the present invention can achieve the resolution 7 times as high as that of the thermal flow rate sensor according to Embodiment 5 of the present invention.

In addition, the thermal flow rate sensor according to Embodiment 7 of the present invention is configured to achieve the frequency response and the resolution comparable to those of the thermal flow rate sensor according to Embodiment 5. Namely, the frequency of the clock of counters 64a to 64c, that is, clock 23 is set to 1/7 of that of the thermal flow rate sensor according to Embodiment 5 of the present invention. Specifically, the frequency of clock 23 is set to 714 kHz instead of 5 MHz. In addition, update signal generator 17 is configured such that update signal 25 and update signal 26 have the frequency of 2 kHz as in the thermal flow rate sensor according to Embodiment 5 of the present invention. Here, as the number of clocks of clock 23 counted in one cycle of update signal 26 is decreased to 1/7 in counters 64a to 64c, the number of output bits of counters 64a to 64c can be reduced from 11 bits to 9 bits. Weighting adder 45 multiplies count results CNTQ1 to CNTQ3 received from counters 64a to 64c by 1, 2 and 4 respectively, and thereafter performs addition. Therefore, digital output 21 has 11 bits.

Accordingly, even if clock 23 has low speed as compared with the thermal flow rate sensor according to Embodiment 5 of the present invention, the thermal flow rate sensor according to Embodiment 7 of the present invention can obtain digital output 21 having the resolution of 11 bits and the frequency response of 2 kHz comparable to those of the thermal flow rate sensor according to Embodiment 5 of the present invention. Therefore, a circuit element for low-speed operation can be used instead of a special circuit element for achieving high-speed operation, and simplified circuit configuration and reduction in manufacturing cost can further be achieved.

Moreover, as the thermal flow rate sensor according to Patent Document 1 supplies an analog output, an AD converter attaining high resolution should be provided in order to improve accuracy of the sensor in a configuration in which the AD converter is simply connected to an analog output for obtaining a digital output, which has resulted in a complicated circuit configuration. In the thermal flow rate sensor according to Embodiment 7 of the present invention, however, AD converter 44 should only have the resolution of 3 bits in order to obtain digital output 21 having the resolution of 11 bits, and the complicated circuit configuration and increase in manufacturing cost due to inclusion of an AD converter attaining high resolution can be avoided.

Another embodiment of the present invention will now be described with reference to the drawings. As the same or corresponding elements have the same reference characters allotted, detailed description thereof will not be repeated.

Embodiment 8

The present embodiment relates to a thermal flow rate sensor different from the thermal flow rate sensor according to Embodiment 7 in a method of counting output data from AD converter 44, that is, a thermal flow rate sensor having a configuration of comparison portion 81 and output operation portion 82 the same as in Embodiment 2. The configuration and operation other than those described below are the same as in the thermal flow rate sensors according to Embodiments 2 and 7.

Figure 23:
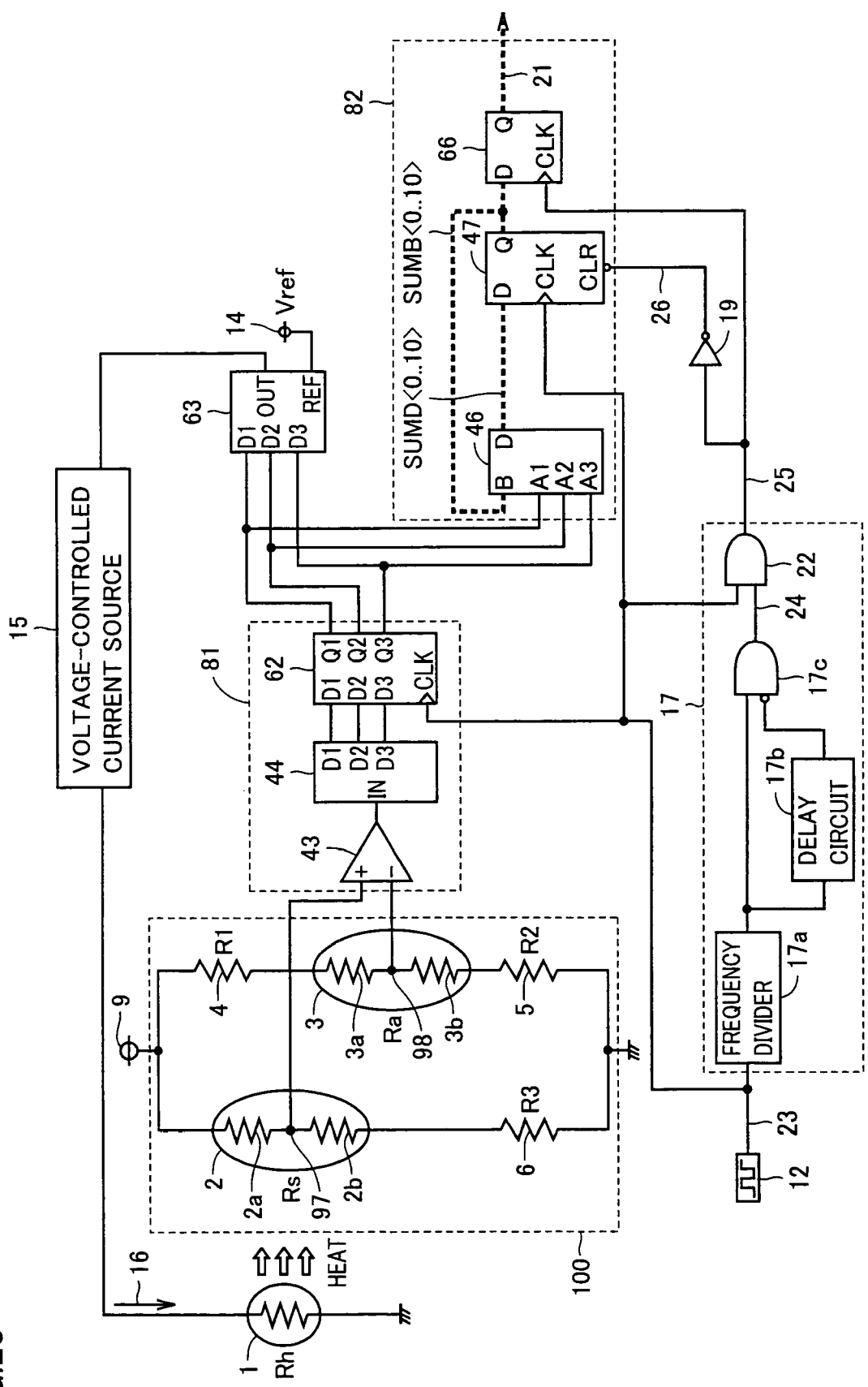
FIG. 23 is a functional block diagram showing a configuration of a thermal flow rate sensor according to Embodiment 8 of the present invention.

FIG. 23 is a functional block diagram showing a configuration of the thermal flow rate sensor according to Embodiment 8 of the present invention. Referring to FIG. 23, the thermal flow rate sensor in the present embodiment is different from the thermal flow rate sensor according to Embodiment 7 in that output operation portion 82 includes adder 46, flip-flop 47 and flip-flop 66.

Even if clock 23 has low speed as compared with the thermal flow rate sensor according to Embodiment 5 of the present invention, the thermal flow rate sensor according to Embodiment 8 of the present invention, as in the thermal flow rate sensor according to Embodiment 7, can obtain digital output 21 having the resolution of 11 bits and the frequency response of 2 kHz comparable to those of the thermal flow rate sensor according to Embodiment 5 of the present invention. Therefore, a circuit element for low-speed operation can be used instead of a special circuit element for achieving high-speed operation, and simplified circuit configuration and reduction in manufacturing cost can further be achieved.

Moreover, in the thermal flow rate sensor according to Embodiment 8 of the present invention, as in the thermal flow rate sensor according to Embodiment 7, AD converter 44 should only have the resolution of 3 bits in order to obtain digital output 21 having the resolution of 11 bits, and the complicated circuit configuration and increase in manufacturing cost due to inclusion of an AD converter attaining high resolution can be avoided. In addition, as adder 46 directly adds the output data from comparison portion 81, counters 64a to 64c are not necessary in the thermal flow rate sensor according to Embodiment 8 of the present invention.

Another embodiment of the present invention will now be described with reference to the drawings. As the same or corresponding elements have the same reference characters allotted, detailed description thereof will not be repeated.

Embodiment 9

The present embodiment relates to a thermal flow rate sensor different from the thermal flow rate sensor according to Embodiment 5 in a method of counting outputs from comparator 10, that is, a thermal flow rate sensor having a configuration of comparison portion 81 and output operation portion 82 the same as in Embodiment 3. The configuration and operation other than those described below are the same as in the thermal flow rate sensors according to Embodiments 3 and 5.

Figure 24:
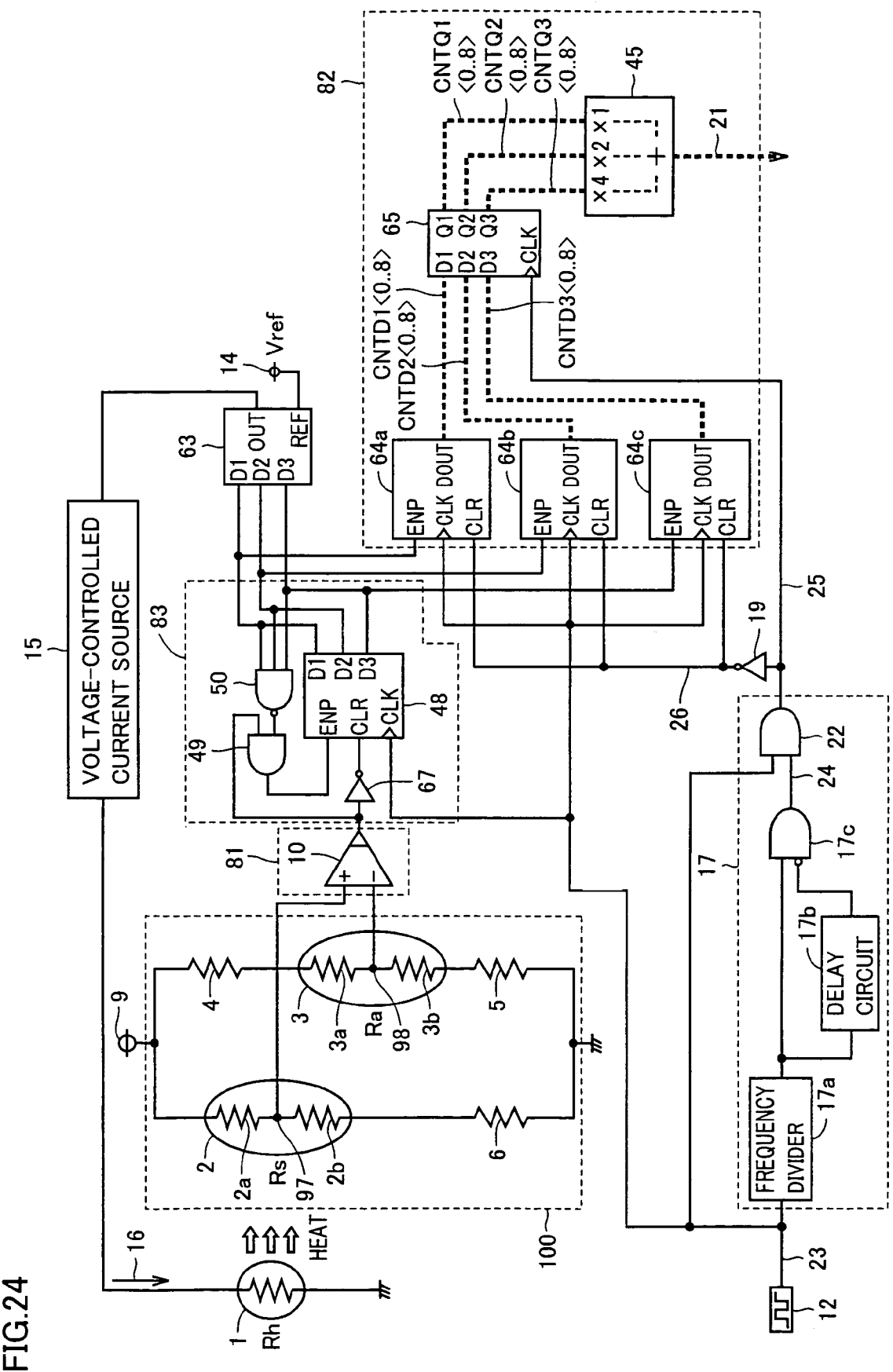
FIG. 24 is a functional block diagram showing a configuration of a thermal flow rate sensor according to Embodiment 9 of the present invention.

FIG. 24 is a functional block diagram showing a configuration of the thermal flow rate sensor according to Embodiment 9 of the present invention. Referring to FIG. 24, the thermal flow rate sensor in the present embodiment is different from the thermal flow rate sensor according to Embodiment 5 in including DA converter 63 instead of DA converter 13. Comparison portion 81 includes comparator 10. Output operation portion 82 includes counters 64a to 64c, flip-flop 65 and weighting adder 45. Counter portion 83 includes counter 48, AND gate 49, NAND gate 50, and inverter 67.

In the thermal flow rate sensor according to Embodiment 5 of the present invention, the sensor output at the maximum of 1 can be obtained in one clock of clock 23. In the thermal flow rate sensor according to Embodiment 9 of the present invention, however, counter 48 outputs the count result of 3 bits, and the sensor output at the maximum of 7 can be obtained in one clock operation, that is, in one clock of clock 23. Therefore, the thermal flow rate sensor according to Embodiment 9 of the present invention can achieve the resolution 7 times as high as that of the thermal flow rate sensor according to Embodiment 5 of the present invention.

The thermal flow rate sensor according to Embodiment 9 of the present invention is similar to the thermal flow rate sensor according to Embodiment 7 in the configuration of output operation portion 82. Therefore, even if clock 23 has low speed as compared with the thermal flow rate sensor according to Embodiment 5 of the present invention, the thermal flow rate sensor according to Embodiment 9 of the present invention can obtain digital output 21 having the resolution of 11 bits and the frequency response of 2 kHz comparable to those of the thermal flow rate sensor according to Embodiment 5 of the present invention. Therefore, a circuit element for low-speed operation can be used instead of a special circuit element for achieving high-speed operation, and simplified circuit configuration and reduction in manufacturing cost can further be achieved.

Another embodiment of the present invention will now be described with reference to the drawings. As the same or corresponding elements have the same reference characters allotted, detailed description thereof will not be repeated.

Embodiment 10

The present embodiment relates to a thermal flow rate sensor obtained by partially combining the thermal flow rate sensors according to Embodiments 8 and 9. The configuration and operation other than those described below are the same as in the thermal flow rate sensor according to Embodiment 5.

Figure 25:
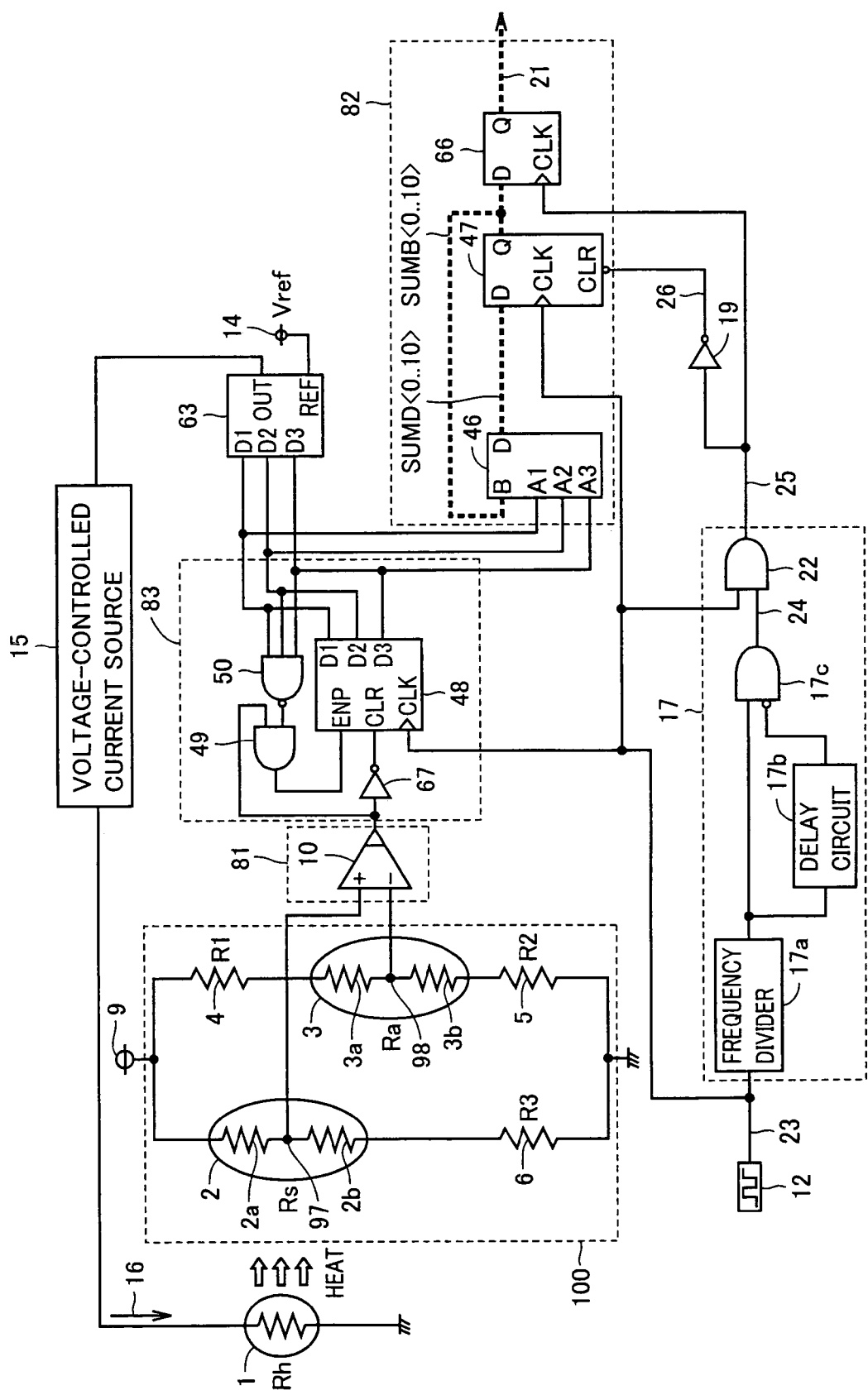
FIG. 25 is a functional block diagram showing a configuration of a thermal flow rate sensor according to Embodiment 10 of the present invention.

FIG. 25 is a functional block diagram showing a configuration of the thermal flow rate sensor according to Embodiment 10 of the present invention. Referring to FIG. 25, the configuration in which comparison portion 81 counts duration during which the output data from comparator 10 is at H level by counting clocks of clock 23 is the same as in the thermal flow rate sensor according to Embodiment 9.

In addition, the configuration in which output operation portion 82 calculates the total of the heating current level in one cycle of update signal 25 and outputs the result of calculation as digital output 21 is the same as in the thermal flow rate sensor according to Embodiment 8.

Therefore, the thermal flow rate sensor according to Embodiment 10 of the present invention can achieve the resolution 7 times as high as that of the thermal flow rate sensor according to Embodiment 5 of the present invention, as in the thermal flow rate sensors according to Embodiments 8 and 9. In addition, a circuit element for low-speed operation can be used instead of a special circuit element for achieving high-speed operation, and simplified circuit configuration and reduction in manufacturing cost can further be achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A flow rate sensor measuring flow rate of a fluid thermally, comprising:
   a heat-generating resistor generating heat in response to a supplied current that is supplied to said heat-generating resistor;
   a bridge circuit including
     four nodes and four legs, two of the legs being connected in series at each of the nodes, wherein said heat-generating resistor is proximate a first leg of said bridge circuit but is not electrically connected to any leg or any node of said bridge circuit,
     a first temperature detector in the first leg of said bridge circuit and having a resistance value varying in response to temperature of said heat-generating resistor, and
     a second temperature detector in a second leg of said bridge circuit and having a resistance value varying in response to temperature of the fluid;
   a comparison portion supplying a digital output indicating difference between voltages at two of the nodes of said bridge circuit;
   a digital-to-analog converter converting an output from said comparison portion to an analog signal and supplying the analog signal to said heat-generating resistor as the supplied current; and
   an output operation portion sequentially adding outputs from said comparison portion for a prescribed time period and outputting the outputs that are sequentially added as a flow rate, for the prescribed time period, of the fluid.

2. A flow rate sensor measuring flow rate of a fluid thermally, comprising:
- a heat-generating resistor generating heat in response to a supplied current that is supplied to said heat-generating resistor;
- a bridge circuit including
  - four nodes and four legs, two of the legs being connected in series at each of the nodes, wherein said heat-generating resistor is proximate a first leg of said bridge circuit but is not electrically connected to any leg or any node of said bridge circuit,
  - a first temperature detector in the first leg of said bridge circuit and having a resistance value varying in response to temperature of said heat-generating resistor, and
  - a second temperature detector having a resistance value varying in response to temperature of the fluid;
- a comparison portion comparing voltages at two of the nodes of said bridge circuit and supplying a digital output indicating results of comparison;
- a counter portion counting duration during which the digital output indicating the results of comparison is constant, by counting a clock signal;
- a digital-to-analog converter converting an output from said counter portion to an analog signal and supplying the analog signal to said heat-generating resistor as the supplied current; and
- an output operation portion sequentially adding outputs from said counter portion for a prescribed time period and outputting the outputs that are sequentially added as a flow rate, for the prescribed time period, of the fluid.

3. A flow rate sensor measuring flow rate of a fluid thermally, comprising:
- a heat-generating resistor generating heat in response to a supplied current that is supplied to said heat-generating resistor;
- first and second circuits connected in parallel, wherein
  - said first circuit includes a first temperature detector having a resistance value varying in response to temperature of said heat-generating resistor;
  - said second circuit includes a second temperature detector having a resistance value varying in response to temperature of the fluid, and
  - said heat-generating resistor is proximate said first temperature detector but is not electrically connected to either of said first or second circuits;
- a comparison portion comparing a voltage at a location other than either end of said first temperature detector to a voltage at a location other than either end of said second temperature detector, and supplying a digital output indicating results of the comparison;
- a voltage-controlled current source determining a value of the supplied current that is supplied to said heat-generating resistor based on the digital output indicating the results of the comparison, regardless of variation in the resistance value of said heat-generating resistor, and supplying the supplied current to said heat-generating resistor; and
- an output determining portion determining a flow rate, for a prescribed time period, of the fluid, based on the digital output indicating the results of the comparison for the prescribed time period, and supplying a digital output indicating the results of the determination.

4. The flow rate sensor according to claim 3, wherein said comparison portion compares a voltage at an intermediate point of said first temperature detector and a voltage at an intermediate point of said second temperature detector and supplies a digital output indicating results of the comparison.

5. The flow rate sensor according to claim 3, wherein said output determining portion calculates a sum of time periods during which an amount of the supplied current that is supplied to said heat-generating resistor is at least equal to a prescribed value in the prescribed time period, based on the digital output indicating the results of the comparison for the prescribed period and outputs the sum of time periods as the flow rate, for the prescribed time period, of the fluid.

6. The flow rate sensor according to claim 3, further comprising a digital-to-analog (DA) converter converting the digital output indicating the results of the comparison to an analog signal, wherein said voltage-controlled current source supplies the supplied current to said heat-generating resistor based on an output of said DA converter.

7. The flow rate sensor according to claim 6, wherein said DA converter has a resolution of at least 2 bits.

8. The flow rate sensor according to claim 3, further comprising a counter portion counting duration during which the digital output indicating the results of the comparison is constant by counting a clock signal, wherein
- said voltage-controlled current source supplies the supplied current to said heat-generating resistor based on results of the counting, and
- said output determining portion sequentially adds the results of the counting for the prescribed time period and outputs results of the sequential adding as the flow rate, for the prescribed time period, of the fluid.

9. The flow rate sensor according to claim 3, wherein said comparison portion supplies a digital output indicating a difference between the voltage at the location other than either end of said first temperature detector and the voltage at the location other than either end of said second temperature detector, and
- said output determining portion sequentially adds digital outputs indicating voltage difference for the prescribed time period and outputs the digital outputs sequentially added as the flow rate, for the prescribed time period, of the fluid.

* * * * *